US009041856B2

(12) United States Patent
Kurita et al.

(10) Patent No.: US 9,041,856 B2
(45) Date of Patent: May 26, 2015

(54) EXPOSURE CONTROL METHODS AND APPARATUS FOR CAPTURING AN IMAGE WITH A MOVING SUBJECT REGION

(75) Inventors: Teppei Kurita, Tokyo (JP); Tomoo Mitsunaga, Kanagawa (JP); Kensei Jo, Tokyo (JP); Shun Kaizu, Tokyo (JP)

(73) Assignee: Sony Corporation, Tokyo (JP)

( * ) Notice: Subject to any disclaimer, the term of this patent is extended or adjusted under 35 U.S.C. 154(b) by 388 days.

(21) Appl. No.: 13/447,320

(22) Filed: Apr. 16, 2012

(65) Prior Publication Data

US 2012/0281133 A1    Nov. 8, 2012

(30) Foreign Application Priority Data

May 2, 2011   (JP) .................................. 2011-102914

(51) Int. Cl.
| | |
|---|---|
| G06T 5/00 | (2006.01) |
| H04N 5/232 | (2006.01) |
| H04N 5/235 | (2006.01) |
| H04N 5/353 | (2011.01) |
| G06T 5/50 | (2006.01) |

(52) U.S. Cl.
CPC ............ *G06T 5/007* (2013.01); *H04N 5/23254* (2013.01); *H04N 5/2353* (2013.01); *H04N 5/2355* (2013.01); *H04N 5/3535* (2013.01); *G06T 5/50* (2013.01); *G06T 2207/10144* (2013.01); *G06T 2207/20208* (2013.01); *G06T 2207/20221* (2013.01)

(58) Field of Classification Search
CPC .................................................. H04N 5/2351
USPC ........................................................ 348/362
See application file for complete search history.

(56) References Cited

U.S. PATENT DOCUMENTS

| | | | | |
|---|---|---|---|---|
| 6,429,895 | B1 * | 8/2002 | Onuki ....................... | 348/208.99 |
| 7,825,969 | B2 * | 11/2010 | Tico et al. ...................... | 348/273 |
| 8,164,685 | B2 * | 4/2012 | Watanabe ....................... | 348/363 |
| 8,379,934 | B2 * | 2/2013 | Jasinski et al. ................. | 382/107 |
| 8,542,315 | B2 * | 9/2013 | Sorek et al. .................... | 348/364 |
| 2006/0245014 | A1 * | 11/2006 | Haneda .......................... | 358/512 |
| 2008/0166018 | A1 * | 7/2008 | Li et al. .......................... | 382/105 |
| 2009/0021621 | A1 * | 1/2009 | Hashimoto et al. ........... | 348/300 |
| 2009/0225189 | A1 * | 9/2009 | Morin .......................... | 348/229.1 |

FOREIGN PATENT DOCUMENTS

| | | | |
|---|---|---|---|
| JP | 2001-358989 | A | 12/2001 |
| JP | 2008-099158 | A | 4/2008 |
| JP | 2010-110004 | A | 5/2010 |
| JP | 2010-136205 | A | 6/2010 |

* cited by examiner

*Primary Examiner* — Roberto Velez
*Assistant Examiner* — Cynthia Segura
(74) *Attorney, Agent, or Firm* — Wolf, Greenfield & Sacks, P.C.

(57) ABSTRACT

A moving subject detection map is generated by performing moving subject region determination based on input image information from an image capture portion, and is used to set an exposure pattern for a moving subject detected pixel region. The exposure pattern is cyclically arranged with multiple different exposure times. The exposure time for a stationary subject region is set according to the brightness of the subject. Regarding an image captured based on the exposure time control, an output image is generated by computing pixel values for a moving subject region, using pixel value combination processing that utilizes the pixel values of pixels with a plurality of different exposure times being set, and by computing pixel values for the stationary subject region by multiplying a gain according to the exposure time. This achieves the acquisition of a dynamic range image while keeping deterioration of the resolution to a minimum.

9 Claims, 21 Drawing Sheets

FIG.7

|  t1 | t3 | t1 | t3 | t1 | t3 |
|----|----|----|----|----|----|
| t4 | t2 | t4 | t2 | t4 | t2 |
| t1 | t3 | t1 | t3 | t1 | t3 |
| t4 | t2 | t4 | t2 | t4 | t2 |
| t1 | t3 | t1 | t3 | t1 | t3 |
| t4 | t2 | t4 | t2 | t4 | t2 |

EXPOSURE CONTROL METHODS AND APPARATUS FOR CAPTURING AN IMAGE WITH A MOVING SUBJECT REGION

CROSS REFERENCE TO RELATED APPLICATIONS

The present application claims priority under 35 U.S.C. § 119 to Japanese Patent Application No. JP 2011-102914, filed in the Japan Patent Office on May 2, 2011, the entire contents of which are incorporated herein by reference.

BACKGROUND OF THE INVENTION

The present disclosure relates to an image capture device, an image capture device control method, and a program. In particular, the present disclosure relates to an image capture device, an image capture device control method, and a program that generate an image with a dynamic range that is wide.

A solid image capture element that is used in a video camera or a digital still camera, such as a CCD image sensor or a complementary metal oxide semiconductor (CMOS) image sensor, accumulates an electrical charge that corresponds to the amount of incident light and performs a photoelectric conversion that outputs an electrical signal that corresponds to the accumulated electrical charge. However, there is an upper limit to the amount of the electrical charge that is accumulated in the photoelectric conversion element, and when more than a fixed amount of light is received, the amount of the accumulated electrical charge reaches a saturation level, such that what are called blown out highlights, which are set at a saturated brightness level, occur in regions of the photographic subject where the brightness is greater than a fixed value.

In order to prevent this sort of phenomenon from occurring, processing is performed that adjusts the exposure time by controlling the period during which the electrical charge is accumulated in the photoelectric conversion element, in accordance with variations in the outside light and the like, and that also adjusts the sensitivity to an optimum value. For example, for a bright subject, the exposure time is shortened by using a faster shutter speed, shortening the period during which the electrical charge is accumulated in the photoelectric conversion element, and the electrical signal is output before the amount of the accumulated electrical charge reaches the saturation level. This sort of processing makes it possible to output an image that accurately reproduces the gray-scale levels of the subject.

However, in capturing an image of a subject that has a mixture of bright regions and dark regions, using a fast shutter speed means that the exposure time will not be sufficient for the dark portions, so the signal-to-noise ratio worsens, and the image quality deteriorates. In order to accurately reproduce the brightness levels of the bright portions and the dark portions in a captured image of a subject that has a mixture of bright regions and dark regions, processing must be performed that increases the exposure time and achieves a high signal-to-noise ratio for the image sensor pixels where the amount of the incident light is low and that avoids saturation in the pixels where the amount of the incident light is high.

As a technique for implementing this sort of processing, a technique is known that sequentially captures and combines a plurality of images with different exposure times. Specifically, an image with a long exposure time and an image with a short exposure time are captured separately in sequence. The technique generates a single image by performing combining processing that uses the long exposure time image for the dark image regions and uses the short exposure time image for the bright image regions where the highlights are blown out in the long exposure time image. Combining a plurality of images with different exposures in this manner makes it possible produce an image with a dynamic range that is wide and in which there are no blown out highlights, that is, a wide dynamic range image (a high dynamic range (HDR) image).

For example, Japanese Patent Application Publication No. JP-A 2008-99158 discloses a configuration that produces a wide dynamic range image by combining a plurality of images with different amounts of exposure. The processing will be explained with reference to FIG. 1. An image capture element, in capturing moving images, for example, outputs image data for two different exposure times within a video rate (30 to 60 fps). In capturing still images, too, the image data are generated for two different exposure times and output. FIG. 1 is a figure that explains characteristics of images (a long exposure time image, a short exposure time image) that the image capture element generates and that have two different exposure times. The horizontal axis is time (t), and the vertical axis is an accumulated electrical charge (e) in a light-receiving photo diode (PD) that configures a photoelectric conversion element that corresponds to one pixel of a solid image capture element.

For example, in a case where the amount of light that the light-receiving photo diode (PD) is large, that is, where it corresponds to a bright subject, the accumulated electrical charge increases rapidly as time elapses, as shown in a high brightness region 11 that is shown in FIG. 1. In contrast, in a case where the amount of light that the light-receiving photo diode (PD) is small, that is, where it corresponds to a dark subject, the accumulated electrical charge increases slowly as time elapses, as shown in a low brightness region 12 that is shown in FIG. 1.

The time from t0 to t3 is equivalent to an exposure time TL for acquiring the long exposure time image. The line that is shown in the low brightness region 12 shows that the accumulated electrical charge at the time t3, even as the long exposure time TL, has not reached the saturation level (unsaturated point Py), and an accurate gray-scale expression can be produced according to the gray level of the pixel that is set using an electrical signal that is produced based on the accumulated electrical charge (Sa).

However, the line that is shown in the high brightness region 11 clearly indicates that the accumulated electrical charge has already reached the saturation level (saturated point Px) before it reaches the time t3. Therefore, in the high brightness region 11, only a pixel value that corresponds to an electrical signal at the saturation level is produced from the long exposure time image, resulting in a pixel that is blown out.

Accordingly, in the high brightness region 11, the accumulated electrical charge is swept out of the light-receiving photo diode (PD) once before the time t3 is reached, for example, at a time t1 (a charge sweeping starting point P1) that is shown in FIG. 1. The charge sweeping does not sweep out the entire accumulated electrical charge in the light-receiving photo diode (PD), but sweeps it down to an intermediate voltage hold level that is controlled by the photo diode (PD). After the charge sweeping processing, the light-receiving photo diode (PD) is once again exposed to light for a short time that is defined as an exposure time TS (from t2 to t3). That is, a short time exposure is made for the period from a short exposure time starting point P2 to a short exposure time ending point P3, which are both shown in FIG. 1. An accumulated electrical charge (Sb) is produced by the short time exposure, and the gray level of the pixel is set using an electrical signal that is produced based on the accumulated electrical charge (Sb).

Note that in the setting of the pixel value using the electrical signal that is based on the accumulated electrical charge (Sa) that is produced by the long time exposure in the low brightness region 12 and using the electrical signal that is based on the accumulated electrical charge (Sb) that is produced by the short time exposure in the high brightness region 11, an estimated accumulated electrical charge is computed for a case in which the exposure times are the same in the two regions, an electrical signal output value that corresponds to the estimated accumulated electrical charge is computed, and the pixel value is set based on the results of the computations.

Combining the short exposure time image and the long exposure time image in this manner makes it possible to produce an image that has no blown out highlights and a dynamic range that is wide.

In addition, for an image capture device that captures a wide dynamic range image, a method for performing exposure control for individual pixels based on advance image capture information, a method for combining images while varying the exposure spatially, and the like are known.

For example, Japanese Patent Application Publication No. JP-A 2001-358989 and Japanese Patent Application Publication No. JP-A 2010-136205 disclose configurations that control exposure and achieve wide dynamic range image capture that maintains high resolution by storing exposure control information based on brightness information for preliminarily captured images, then incorporating that information as parameters in the conditions for the next image capture.

However, with the method that utilizes a plurality of captured images, as has been explained with reference to FIG. 1, and with the configuration that performs processing that controls the exposure based on the advance image capture information, in a case where the subject is moving, fluctuations occur in the pixel values. Therefore, with the method that utilizes a plurality of captured images, as has been explained with reference to FIG. 1, erroneous pixel values are set when the combined image is generated.

Furthermore, with the method that performs exposure control based on the brightness information for preliminarily captured images, the exposure control information that is set for the individual pixels in advance becomes erroneous information, and it becomes impossible to achieve optimum control.

Problems therefore arise, in that when the pixel that has changed from dark to bright, the exposure is much greater than what was anticipated, so the pixel becomes saturated, and when the pixel that has changed from bright to dark, the exposure is much less than what was anticipated, so the signal-to-noise ratio decreases, for example.

Furthermore, in Japanese Patent Application Publication No. JP-A 2010-110004, a wide dynamic range is achieved by providing a plurality of sensors with different sensitivities, arranging them in a fixed pattern, and interpolating low exposures and high exposures among the individual pixels.

With this method the exposure of each pixel is fixed, irrespective of the time, so the method is resistant to the effects of a moving subject. However, because the low sensitivity and high sensitivity sensors are arranged in a fixed pattern, the sampling sensitivity range is wider than with the known RGB sensors, so a problem occurs in that the image resolution decreases.

SUMMARY OF THE INVENTION

The present disclosure, in light of the problems that are described above, for example, provides an image capture device, an image capture device control method, and a program that generate an image with a dynamic range that is wide and in which a decrease in the image quality due to a moving subject is limited.

According to an aspect of the present disclosure, there is provided an image capture device, including an image capture portion, an exposure control portion that performs control of exposure times for the image capture portion such that the exposure times are different for different pixel regions, and an output image generation portion that generates an output image by performing signal processing on a current image that the image capture portion has output. The exposure control portion may include a moving subject detection portion that generates a moving subject detection map that includes moving subject region identification information for the current image that the image capture portion has output, and an appropriate exposure value computation portion that generates an exposure control map and outputs exposure control signals that are based on the generated exposure control map, the exposure control map being generated by referring to the moving subject detection map and having an exposure pattern that cyclically applies a plurality of different exposure times to a moving subject region, and the exposure control signals being output to the image capture portion, with one signal being output for each of the pixel regions. The output image generation portion may compute output image pixel values by combining a plurality of pixel value information items for a plurality of pixels for which the plurality of the different exposure times have been set that are derived from the moving subject region.

In addition, according to an embodiment of the image capture device of the present disclosure, the appropriate exposure value computation portion may generate the exposure control map and output the exposure control signals that are based on the generated exposure control map, the exposure control map being generated by referring to the moving subject detection map and setting the exposure time for a stationary subject region in accordance with the brightness of the subject, and the exposure control signals being output to the image capture portion, with one signal being output for each of the pixel regions.

In addition, according to an embodiment of the image capture device of the present disclosure, the appropriate exposure value computation portion may generate the exposure control map to define the exposure pattern that is set for the moving subject region such that the same exposure time is not set for adjacent pixels.

In addition, according to an embodiment of the image capture device of the present disclosure, the output image generation portion may include a moving subject pixel signal processing portion that, by combining the plurality of the pixel value information items for the plurality of the pixels for which the plurality of the different exposure times have been set that are derived from the moving subject region, computes the output image pixel values such that they have a wider dynamic range than the pixel values of the individual pixels that have been output by the image capture portion.

In addition, according to an embodiment of the image capture device of the present disclosure, the output image generation portion may include a stationary subject pixel signal processing portion that performs processing that computes the output image pixel values for the individual pixels by multiplying a large gain for a pixel where the exposure time is short and multiplying a small gain for a pixel where the exposure time is long.

In addition, according to an embodiment of the image capture device of the present disclosure, the image capture device may include a reduced image generation portion that reduces the current image that the image capture portion has output. The exposure control portion may input the reduced image that has been generated by the reduced image generation portion and generate the moving subject detection map, the exposure control map, and the exposure control signals based on the reduced image.

In addition, according to an embodiment of the image capture device of the present disclosure, the image capture device may include a storage portion that stores the current image that the image capture portion has output. The moving subject detection portion may generate the moving subject detection map by using the current image that the image capture portion has output and a past image that is stored in the storage portion.

In addition, according to a second aspect of the present disclosure, there is provided an image capture device control method that is implemented in an image capture device, including the steps of the performing image capture by an image capture portion, the performing control by an exposure control portion of exposure times for the image capture portion such that the exposure times are different for different pixel regions, and the generating an output image by an output image generation portion by performing signal processing on a current image that the image capture portion has output. The performing of the control of the exposure times may include the steps of the generating a moving subject detection map that includes moving subject region identification information for the current image that the image capture portion has output, and the generating an exposure control map and outputting exposure control signals that are based on the generated exposure control map, the exposure control map being generated by referring to the moving subject detection map and having an exposure pattern that cyclically applies a plurality of different exposure times to a moving subject region, and the exposure control signals being output to the image capture portion, with one signal being output for each of the pixel regions. The generating of the output image may include the step of the computing output image pixel values by combining a plurality of pixel value information items for a plurality of pixels for which the plurality of the different exposure times have been set that are derived from the moving subject region.

In addition, according to a third aspect of the present disclosure, there is provided a program that causes image capture device control processing to be performed in an image capture device, the program including the steps of the causing an image capture portion to perform image capture, the causing an exposure control portion to perform control of exposure times for the image capture portion such that the exposure times are different for different pixel regions, and the causing an output image generation portion to generate an output image by performing signal processing on a current image that the image capture portion has output. The performing of the control of the exposure times may include the steps of the generating a moving subject detection map that includes moving subject region identification information for the current image that the image capture portion has output, and the generating an exposure control map and outputting exposure control signals that are based on the generated exposure control map, the exposure control map being generated by referring to the moving subject detection map and having an exposure pattern that cyclically applies a plurality of different exposure times to a moving subject region, and the exposure control signals being output to the image capture portion, with one signal being output for each of the pixel regions. The generating of the output image may include the step of the computing output image pixel values by combining a plurality of pixel value information items for a plurality of pixels for which the plurality of the different exposure times have been set that are derived from the moving subject region.

Note that the program according to the present disclosure is a program that can be provided in a storage medium or communication medium that is provided in a computer-readable form for an information processing device or a computer system that is capable of executing various types of program code, for example. Providing this sort of program in a computer-readable form makes it possible to implement the processing according to the program in the information processing device or the computer system.

The object, features, and advantages of the present disclosure will be made clear later by a more detailed explanation that is based on the embodiments of the present disclosure and the appended drawings.

According to the configuration of one of the examples of the present disclosure, the determining of the moving subject region is performed based on the input image information from the image capture portion, the moving subject detection map is generated, and the generated moving subject detection map is used to set an exposure pattern for a moving subject detected pixel region, the exposure pattern being a pattern in which a plurality of different exposure times are cyclically arranged. For a stationary subject region the setting of the exposure times is performed in accordance with the brightness of the subject.

With respect to an image that is captured based on this sort of exposure time control, the output image is generated by computing pixel values with a wide dynamic range for the moving subject region, using pixel value combination processing that utilizes the pixel values of pixels for which a plurality of different exposure times have been set, and by computing pixel values with a wide dynamic range for the stationary subject region by multiplying the gain in accordance with the exposure time. This processing achieves the acquisition of a wide dynamic range image across all of the regions while keeping deterioration of the resolution to a minimum.

BRIEF DESCRIPTION OF THE DRAWINGS

FIG. 7 is a figure that shows an example of an exposure control pattern of pixels for a moving subject, the pattern being a fixed pattern in which the values in the spaces vary cyclically;

DETAILED DESCRIPTION OF EMBODIMENT

Figure 1:
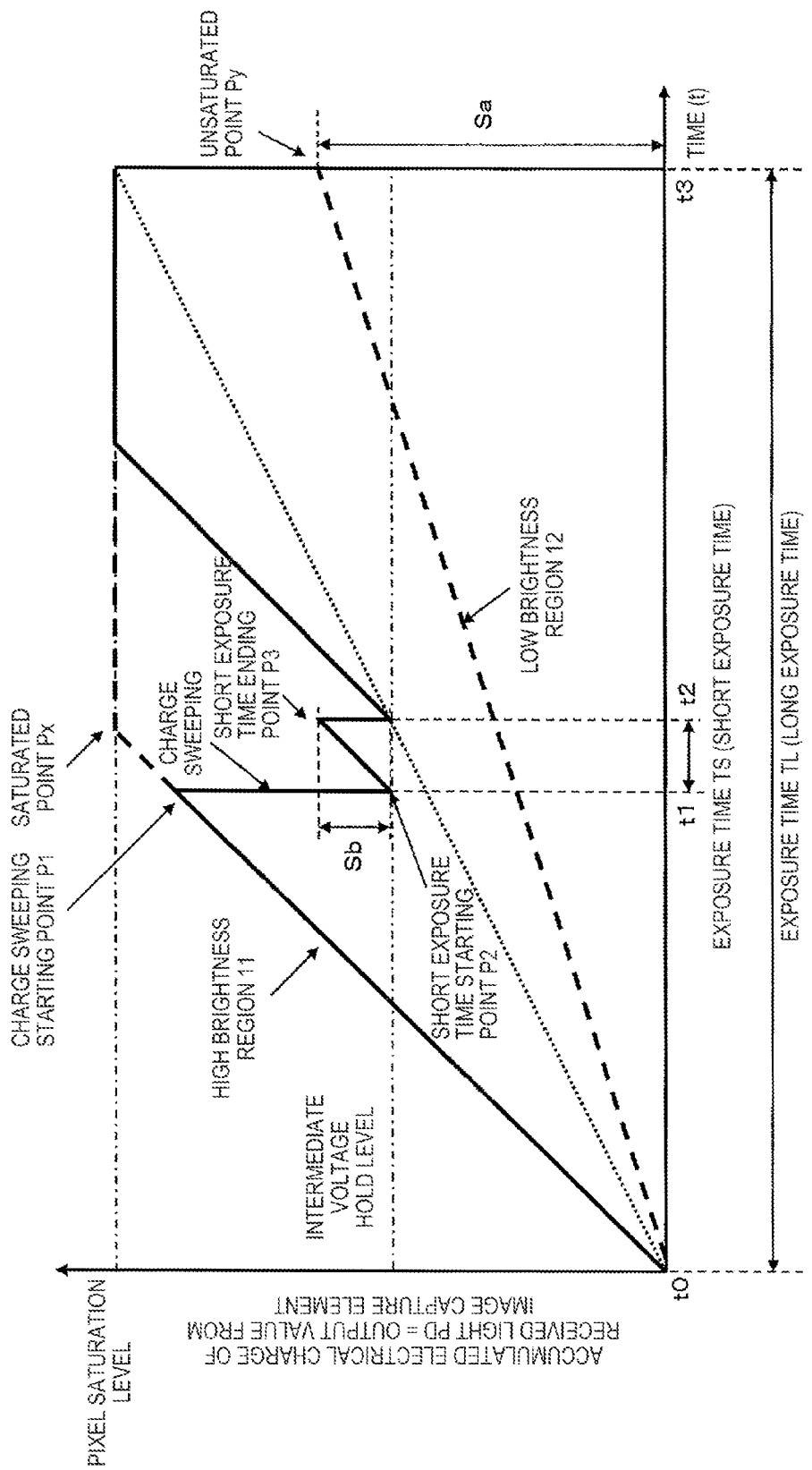
FIG. 1 is a figure that explains processing that produces an image with a wide dynamic range by combining a plurality of images with different amounts of exposure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, an image capture device, an image capture device control method, and a program according to the present disclosure will be explained with reference to the drawings. The explanation will cover the items below in order.

1. Configuration and processing of a first example of the image capture device
2. Configuration and processing of a second example of the image capture device
3. Configuration and processing of a third example of the image capture device
4. Configuration and processing of a fourth example of the image capture device
5. Summary of the configurations of the present disclosure 1. Configuration and processing of the first example of the image capture device First, the first example of the image capture device according to the present disclosure will be explained.

Figure 2:
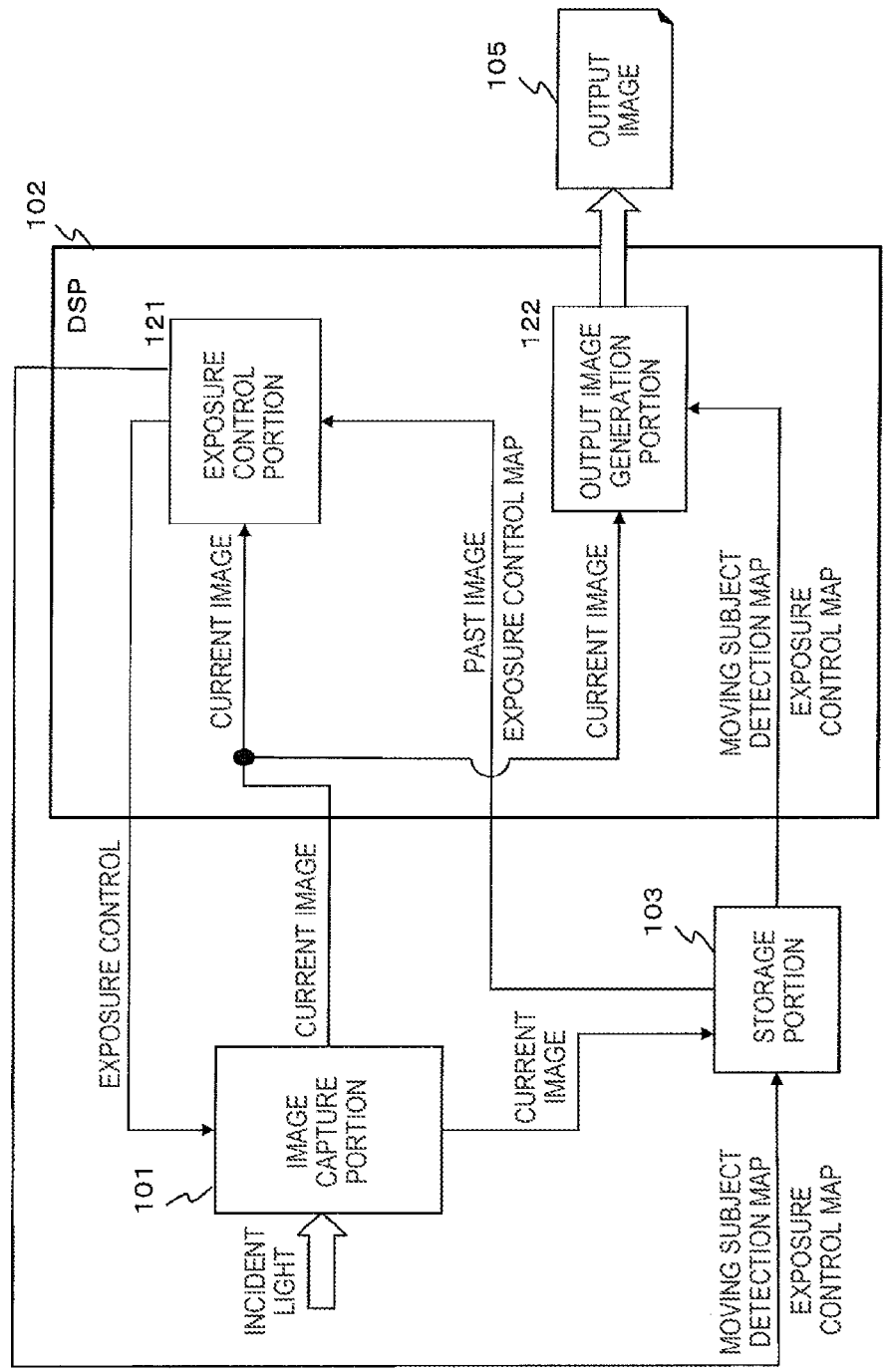
FIG. 2 is a figure that shows an example of a configuration of an image capture device according to the present disclosure.

FIG. 2 is a block diagram that shows an example of a configuration of the image capture device according to the first example of the present disclosure. The image capture device according to the present embodiment includes an image capture portion 101, a digital signal processor (DSP) 102 that serves as an image signal processing portion, and a storage portion 103.

The DSP 102 includes an exposure control portion 121 and an output image generation portion 122.

Note that in addition to the structural elements that are shown in FIG. 2, the image capture device is also provided with structural elements for performing the functions of a camera, such as a control portion that performs control of the various structural portions, specifically, a control portion that is provided with a CPU or the like that has a function for executing a program, a memory (a storage portion) that stores a program or the like that is executed by the control portion, an operation portion such as a shutter or the like that is operated by a user, a display portion that is configured from an LCD or the like and that performs output of an image, and the like.

The image capture portion 101 takes incident light as an input and produces, as an output, an image that is generated by photoelectric conversion. The image capture portion 101 is configured from an optical lens and a CMOS image sensor or the like, for example.

The exposure control portion 121 performs control of the exposure time for the image capture portion 101. The image capture device according to the present disclosure performs the exposure time control at one of the level of the individual pixels and the level of pixel regions.

Figure 3:
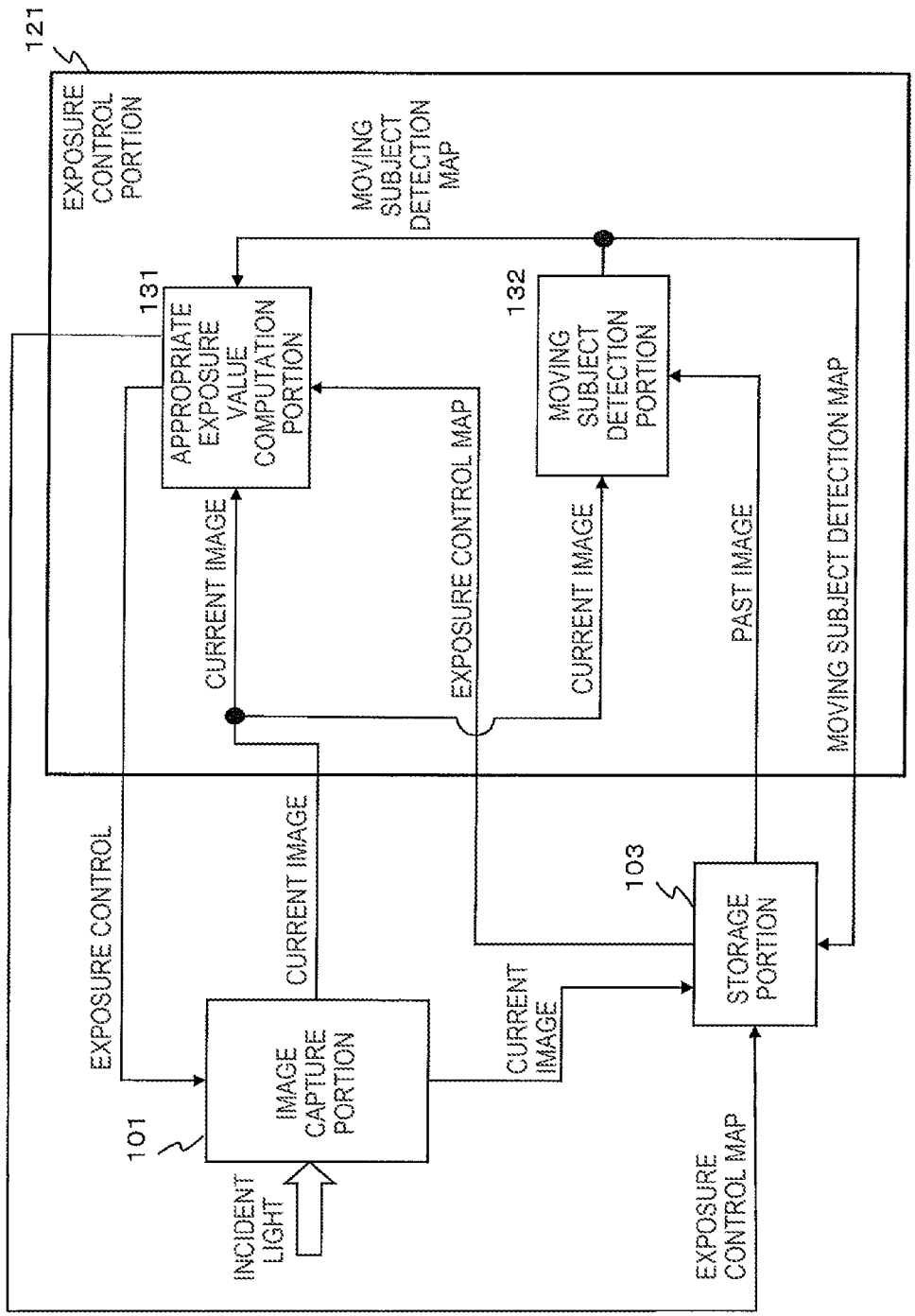
FIG. 3 is a figure that explains an example of a configuration of an exposure control portion in the image capture device according to the present disclosure.

As shown in FIG. 3, the exposure control portion 121 includes a moving subject detection portion 132 and an appropriate exposure value computation portion 131.

As shown in FIGS. 2 and 3, a current image, which is the most recently captured image that has been produced by the image capture portion 101, is output to the exposure control portion 121 and is also stored in the storage portion 103.

In addition to inputting the current image, which is the most recent input image from the image capture portion 101, the exposure control portion 121 inputs a past image, which is an image that was input at an earlier time than the current image and that is stored in the storage portion 103, and an exposure control map. The exposure control portion 121 outputs an updated exposure control map and a moving subject detection map.

Note that the exposure control map is a map in which an optimum exposure time is set for each individual pixel in an image capture element of the image capture portion 101.

The moving subject detection map is a map in which a moving subject region and a stationary subject region that have been detected based on the input image from the image capture portion 101 can be identified at the level of the individual pixels.

The exposure control map and the moving subject detection map are updated one of every time an image frame is captured and every time a predetermined number of frames have been captured.

The moving subject detection portion 132 determines the moving subject region by taking the current image, which is the input image that has been produced by the image capture portion 101, and comparing it to the past image that is stored in the storage portion 103. The moving subject detection portion 132 then updates the moving subject detection map, stores it in the storage portion 103, and outputs it to the appropriate exposure value computation portion 131.

The appropriate exposure value computation portion 131 performs updating of the exposure control map by inputting the current image, which is the input image that has been produced by the image capture portion 101, acquiring from the storage portion 103 the exposure control map that has been generated based on past frames, and inputting the updated moving subject detection map from the moving subject detection portion 132. Exposure time control is performed at the level of the individual pixels in the image capture element of the image capture portion 101, based on the updated exposure control map.

The updated exposure control map is then stored in the storage portion 103.

As will be explained in detail later, for a stationary subject captured pixel region in which it has been determined, based on the moving subject detection map, that an image of a stationary subject has been captured, the exposure control map is created as a map in which the exposure times have been set in accordance with the brightness of the subject.

In contrast, for a region that, based on the moving subject detection map, has been determined to be a moving subject captured pixel region in which an image of a moving subject has been captured, the exposure control map is created as a map in which an exposure pattern is set that includes a combination of different exposure times that have been set in advance.

A specific example of the exposure control map will be explained at a later stage.

Based on the updated exposure control map, the exposure control portion 121 performs the exposure control for either the individual pixels or distinct pixel regions of the image capture element that is provided in the image capture portion 101. The updated exposure control map and moving subject detection map in the exposure control portion 121 are stored in the storage portion 103 and are then used for the exposure control for the captured frame.

Figure 4:
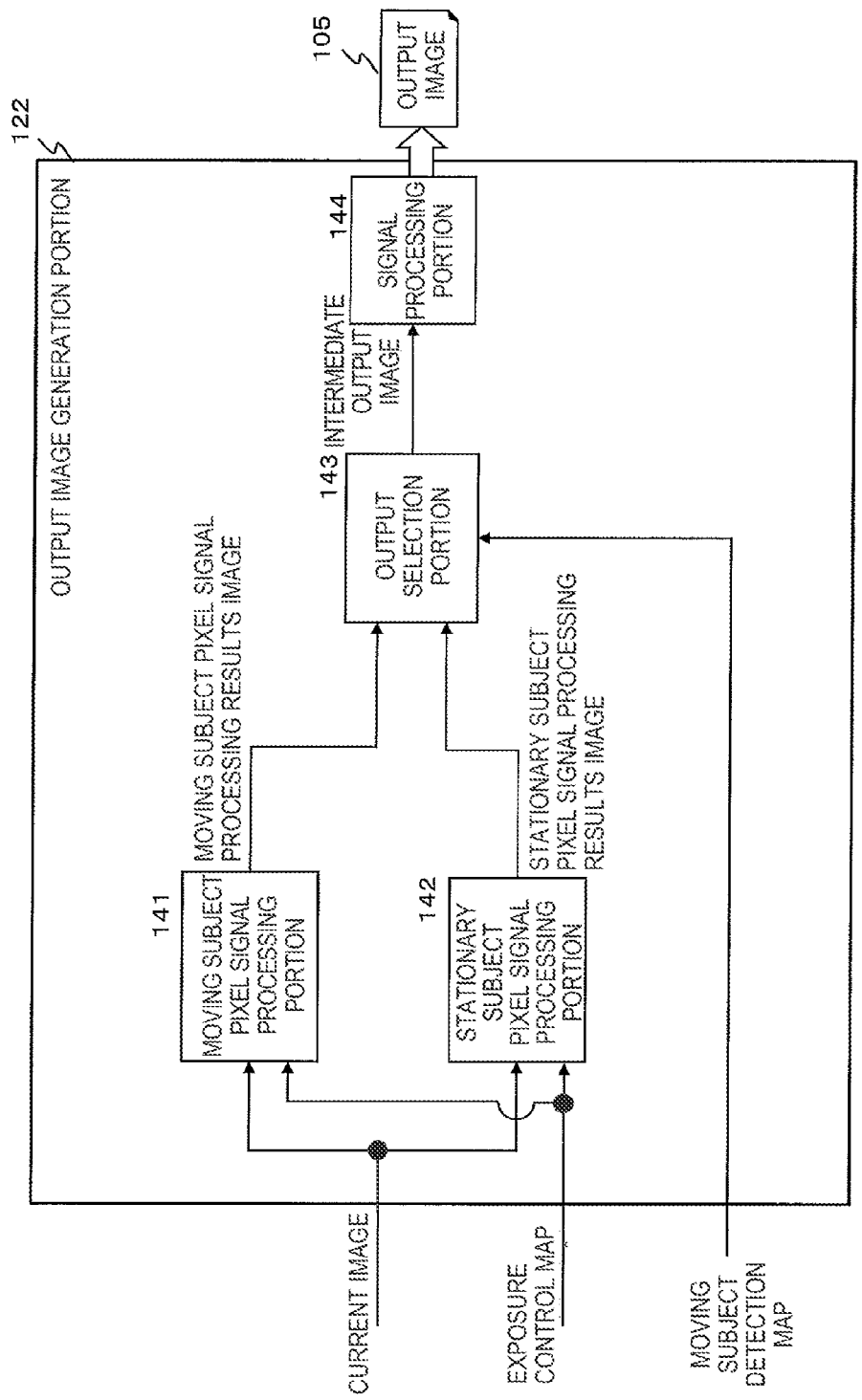
FIG. 4 is a figure that explains an example of a configuration of an output image generation portion in the image capture device according to the present disclosure.

As shown in FIG. 4, the output image generation portion 122 includes a moving subject pixel signal processing portion 141, a stationary subject pixel signal processing portion 142, an output selection portion 143, and a signal processing portion 144.

The output image generation portion 122 inputs the current image that is produced by the image capture portion 101, as well as the exposure control map and the moving subject detection map that are stored in the storage portion 103, and outputs an image that is produced as a final result.

With respect to the current image that is produced by the image capture portion 101, the moving subject pixel signal processing portion 141 performs signal processing that has been set in advance and that is suited to a moving subject.

With respect to the current image that is produced by the image capture portion 101, the stationary subject pixel signal processing portion 142 performs signal processing that has been set in advance and that is suited to a stationary subject.

Note that the signal processing for both the moving subject and the stationary subject is performed by applying exposure control information to the current image and taking into consideration the exposure times for the individual pixels.

The output selection portion 143 inputs the signal processing results from the moving subject pixel signal processing portion 141 and the stationary subject pixel signal processing portion 142, respectively, and also inputs the moving subject detection map from the storage portion 103. Based on the map that was input, the output selection portion 143 creates an intermediate output image by selecting the signal processing results from the moving subject pixel signal processing portion 141 for the moving subject region and selecting the signal processing results from the stationary subject pixel signal processing portion 142 for the stationary subject region. The intermediate output image is output to the signal processing portion 144.

The signal processing portion 144 performs various types of signal processing, such as white balance adjustment, color correction, noise reduction, grayscale correction, gamma correction, demosaicing, and the like, then generates and outputs an output image 105 as a final result.

Next, the configuration and the processing of the exposure control portion 121 in the image capture device according to the present example will be explained in detail with reference to FIG. 3.

The incident light undergoes photoelectric conversion by the image capture portion 101, and the current image, which is the most recently input image, is input to the appropriate exposure value computation portion 131 and the moving subject detection portion 132 of the exposure control portion 121. If the amount of the incident light for a given pixel is defined as L, the exposure time is defined as t, the aperture value is defined as F, and a constant that depends on the sensitivity is defined as k, a pixel value q is expressed by the equation below.

[Math 1]

$$q = k\frac{t}{F^2}L \tag{1}$$

However, in a case where the pixel value q has exceeded a saturated pixel value qmax, the pixel is saturated, and q=qmax.

Figure 5:
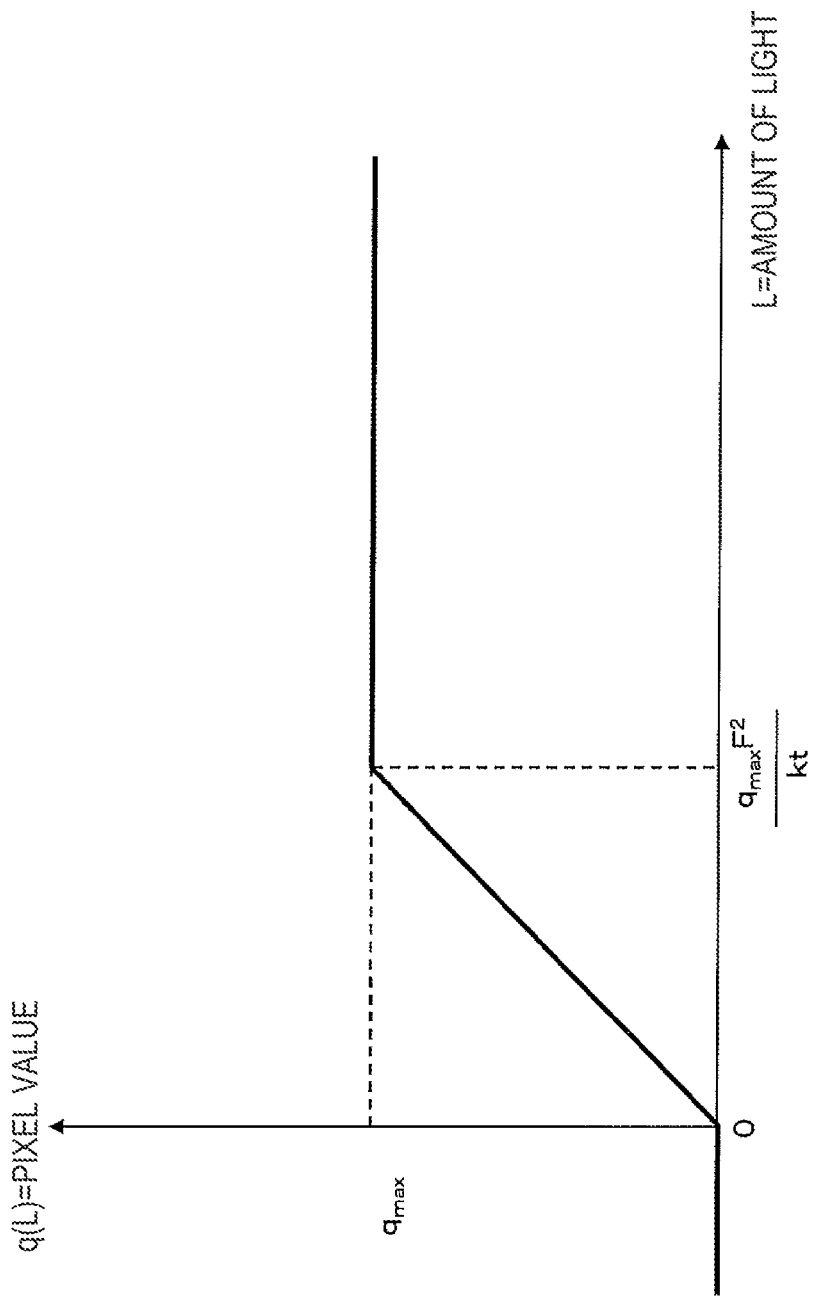
FIG. 5 is a figure that shows, as a function q(L), variation in a pixel value that is output by an image capture portion in accordance with an amount of light L.

FIG. 5 shows, as a function q(L), the variation in the pixel value that the image capture portion 101 outputs in accordance with the amount of light L. It can be seen that the pixel value reaches saturation, and becomes equal to the saturated pixel value qmax, where a certain amount of light (qmaxF2/kt) is defined as a boundary.

For the sake of simplicity, the present example takes into consideration a case in which only the exposure time t can be controlled. That is, in the appropriate exposure value computation portion 131, only the appropriate exposure time is computed. A pixel value q(L, t) when both the exposure time t and the amount of light L are varied is expressed by the function below.

[Math 2]

$$q(L, t) = k\frac{t}{F^2}L \tag{2}$$

Figure 6:
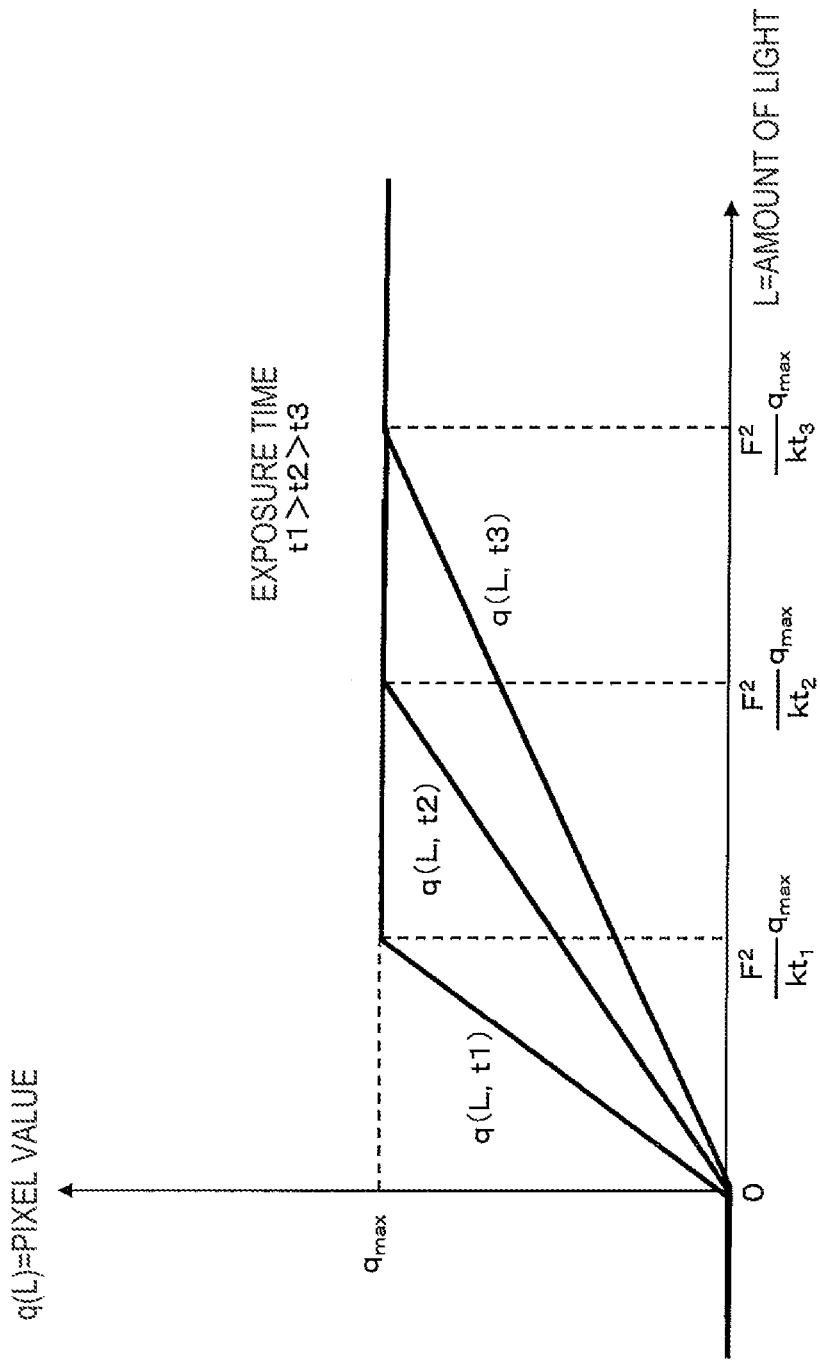
FIG. 6 is a figure that shows, as a function q(L, t), variation in the pixel value that is output by the image capture portion in accordance with the amount of light L and an exposure time t.

As shown in FIG. 6, the longer the exposure time t becomes, the less the amount of light L becomes at which the output of the image capture portion 101 becomes saturated.

As shown in FIG. 3, the image capture results from the past that are stored in the storage portion 103 are input to the moving subject detection portion 132 at the same time. In the moving subject detection portion 132, processing is performed that uses the signals for both the current image and the past image to detect whether each individual pixel is in the moving subject region or not, and then outputs the moving subject detection map. The method for detecting the moving subject will be described in detail later.

In the appropriate exposure value computation portion 131, the exposure time for each individual pixel is set according to the setting formats for two sets of exposure times, in accordance with the moving subject detection map that was generated by the moving subject detection portion 132. For the pixels (the stationary subject pixels) in the moving subject detection map where a moving subject was not detected, the appropriate exposure time is computed one pixel at a time, based on the current image and the exposure control map. The computing of the appropriate exposure time is generally performed according to a method that sets the exposure automatically.

For example, in the setting of the exposure time for a given pixel in an N-th frame, focus on the pixel values surrounding the given pixel in an (N−1)-th frame and assume that the average value for those pixels is 18% gray. Specifically, if the average value of the pixels that are adjacent to the given pixel in the (N−1)-th frame is $q_{N-1}$ and the exposure time is $t_{N-1}$, then the appropriate exposure time $t_N$ for the N-th frame is derived by the equation below.

[Math 3]

$$t_N = 0.18 \times \frac{q_{max}}{q_{N-1}} t_{N-1} \quad (3)$$

For the pixels (the moving subject pixels) in which the moving subject was detected according to the moving subject detection map, the exposure times are set in a fixed pattern such that the values change cyclically in space. Specifically, the fixed pattern is one in which the pixels are arranged in alternation such that pixels with different K types of exposures are not spatially adjacent to one another, as shown in FIG. 7, for example.

The settings that are shown in FIG. 7 are an array for which K is defined as equal to 4, t1 is defined as the longest exposure time, t4 is defined as the shortest exposure time, and the relationships among the exposure times are set such that t1>t2>t3>t4.

One of these four different exposure times is set for each of the pixels, and the pixels that have the same exposure time are set such that they are not adjacent to one another.

Note that image capture processing that uses this sort of fixed exposure pattern is explained in detail in Japanese Patent Application Publication No. JP-A 2010-110004.

In accordance with the moving subject detection map that has been generated in this manner by the moving subject detection portion 132, the appropriate exposure value computation portion 131 sets the exposure times in the stationary subject region according to the brightness of the subject in each pixel, sets the exposure times in the moving subject region according to the pattern of the combination of the plurality of the different exposure times that are shown in FIG. 7, for example, and one of generates and updates, in accordance with the setting formats for these two sets of exposure times, the exposure control map in which the exposure times that correspond to the individual pixels are set.

The exposure control portion 121 uses the exposure control map that has been one of generated and updated to control the exposure time for each individual pixel in the image capture portion 101. By utilizing the past image capture information, this sequential flow enables image capture with an appropriate exposure time for each individual pixel.

In the exposure control processing in the present example, a fixed exposure pattern is used for the pixels that, according to the moving subject detection map, correspond to the region where the image of the moving subject is captured.

Figure 8:
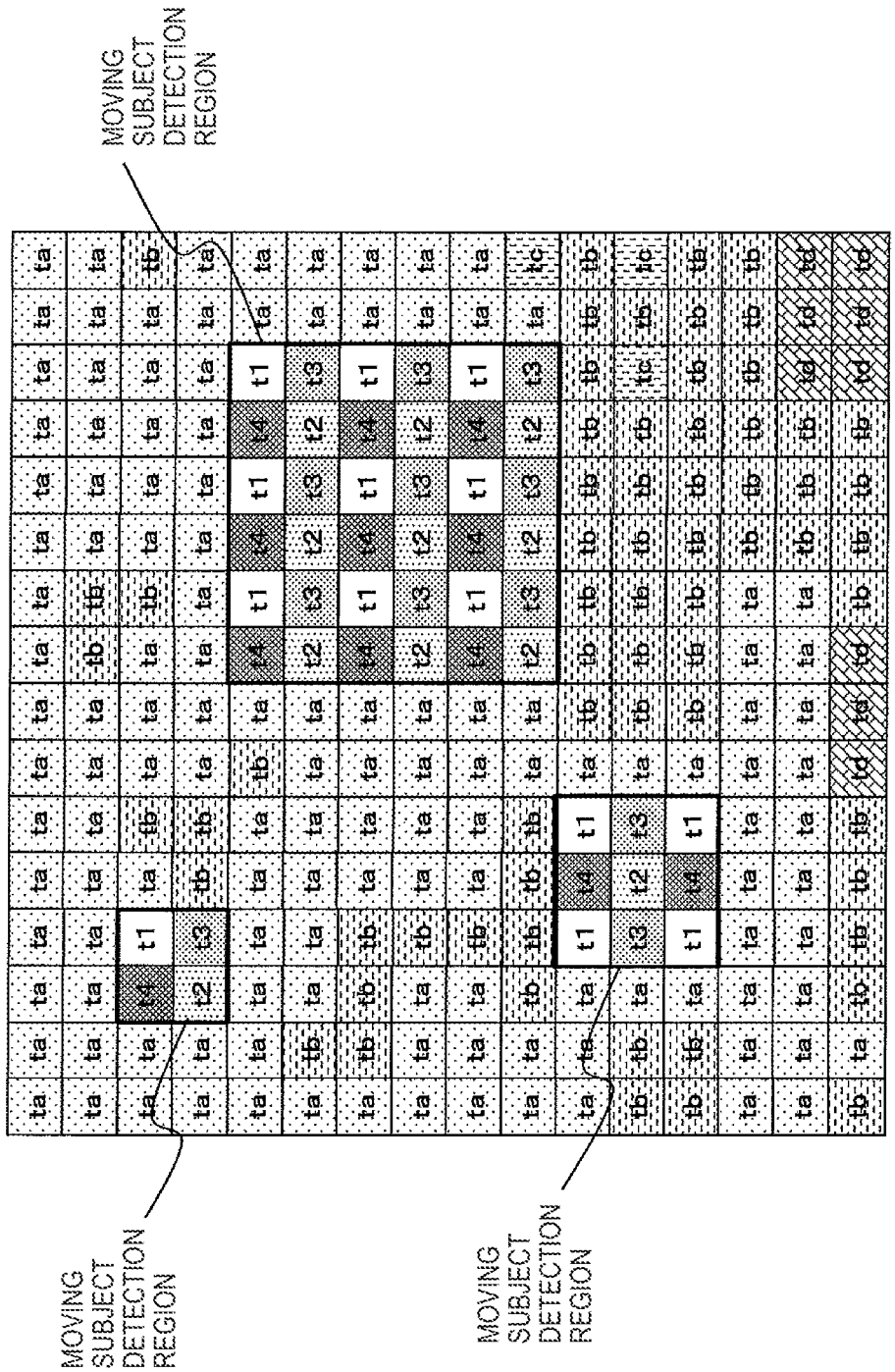
FIG. 8 is a figure that explains an example of exposure control in the image capture device according to the present disclosure.

An example of specific exposure time settings is shown in FIG. 8.

FIG. 8 shows an example of the exposure time settings for the individual pixels in the image capture element of the image capture portion 101.

In FIG. 8, ta, tb, tc, and td indicate exposure times that correspond to the stationary subject region. In the stationary subject region, the exposure times are set in accordance with the brightness of the subject. The exposure times ta to td are set such that ta>tb>tc>td, so that ta indicates the longest exposure time, and td indicates the shortest exposure time.

The exposure times are set according to the brightness of the subject.

In contrast, the closed rectangular regions that are framed by heavy lines are the moving subject regions.

For the moving subject regions, the four types of exposure times are used that were explained above with reference to FIG. 7, that is, t1>t2>t3>t4. The four different exposure times are apportioned in a cyclical exposure pattern in which the pixels that have the same exposure time are set such that they are not adjacent to one another.

Next, the configuration and the processing of the output image generation portion 122 within the DSP 102 in the image capture device that is shown in FIG. 2 will be explained in detail with reference to FIG. 4 and other drawings.

As shown in FIGS. 2 and 4, the output image generation portion 122 inputs the current image from the image capture portion 101 and also inputs the exposure control map and the moving subject detection map that are stored in the storage portion 103.

As is shown in FIG. 4, the current image and the exposure control map are each input to both the moving subject pixel signal processing portion 141 and the stationary subject pixel signal processing portion 142.

In the moving subject pixel signal processing portion 141, each of the pixels that are presumed to have been captured in the fixed exposure pattern that was explained previously with reference to FIG. 7, for example, is combined with the adjacent pixels, which have different exposure times, and a wide dynamic range result is output.

In this case, it is presumed that the amount of light L that is incident upon the adjacent pixels is nearly uniform. Specifically, the sum of the values of the adjacent pixels in a single channel that holds N types of exposure times is expressed as shown below.

$$q\mathrm{sum}(L) = q(L, t1) + q(L, t2) + \ldots q(L, tN)$$

Converting the sum qsum(L) into a value Q(L), that is, the Q(L) that is shown by the equation below, which is a value that does not take saturation into account when the exposure time is the longest exposure time tmax in the exposure control map (when the range is wide), makes it possible to quantize the pixel values for all of the pixels at a high gray level without compressing the pixel values.

[Math 4]

$$Q(L) = k\frac{t_{max}}{F^2}L \quad (4)$$

Figure 9:
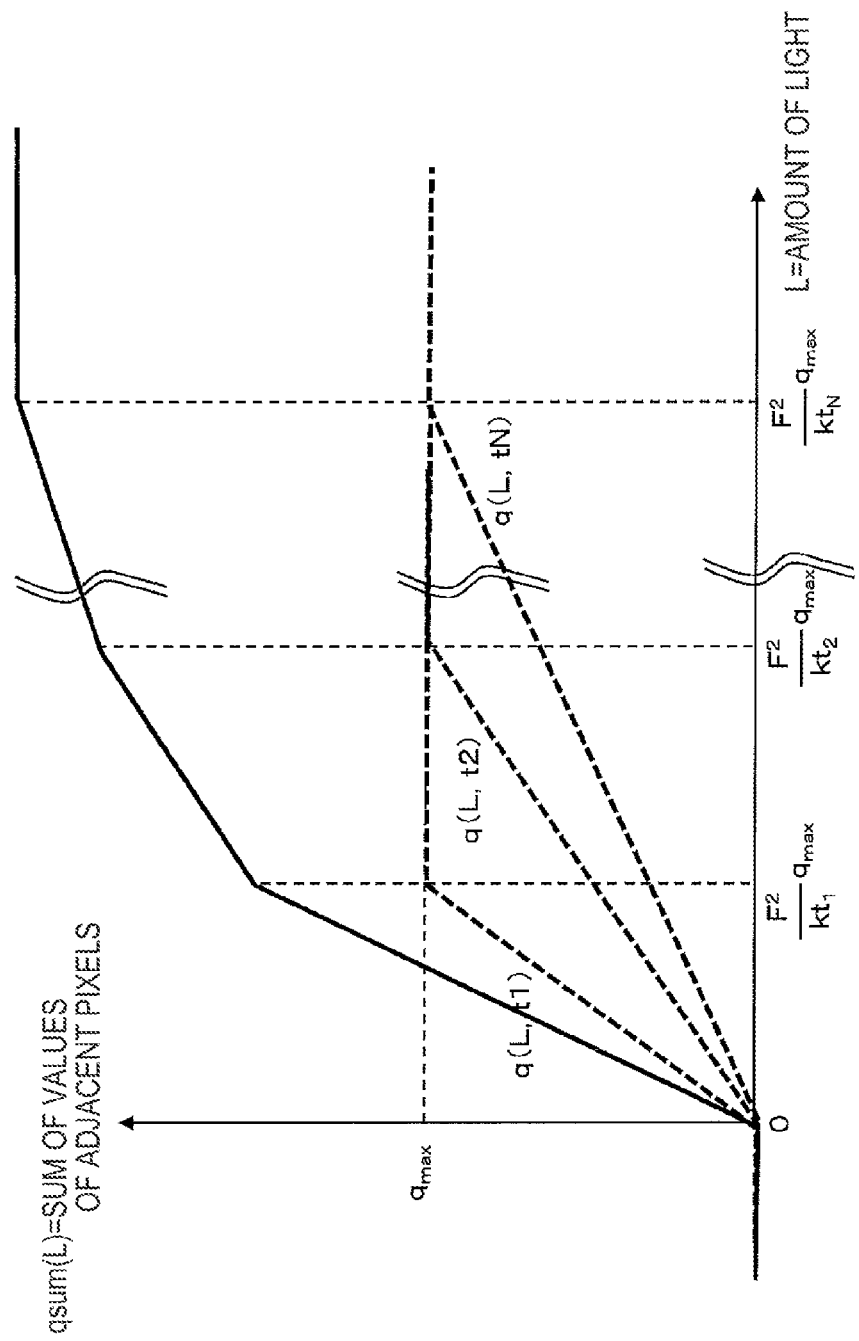
FIG. 9 is a figure that explains processing that computes a sum qsum(L) of values for adjacent pixels in a single channel that holds N types of exposure times.

Note that in the equation above, qsum(L) takes a value like that shown below, according to the amount of light L, as shown in FIG. 9.

[Math 5]

$$q_{sum}(L) = \sum_{i=1}^{N} q(L, t_i) = \begin{cases} \frac{kL}{F^2}\sum_{i=1}^{N} t_i & \text{if } (q(L, t_1) \le q_{max}) \\ \frac{kL}{F^2}\sum_{i=n+1}^{N} t_i + nq_{max} & \text{if } (q(L, t_{n+1}) \le q_{max} < q(L, t_n)) \\ Nq_{max} & \text{if } (q_{max} < q(L, t_N)) \end{cases} \quad (5)$$

Note that in the equation above, t1>t2> . . . >tN.

tn indicates an n-th (1≤n<N) exposure time in a sequence that starts with the longest exposure time.

The problem setting in this case is the converting of the sum qsum(L) of the values of the adjacent pixels in the single channel that holds N types of exposure times into the corrected pixel value Q(L) as the output pixel value. The function qsum(L) in the equation above exhibits a monotonic increase in relation to the amount of light L until all of the pixels reach saturation, and Q(L) similarly exhibits a monotonic increase in relation to the amount of light L, so it can be seen that the conversion can be made by performing a linear computation on qsum(L).

Specifically, a linear conversion is performed such that the equation below holds true.

[Math 6]

$$Q(L) = aq_{sum}(L) + b \quad (6)$$

Figure 10:
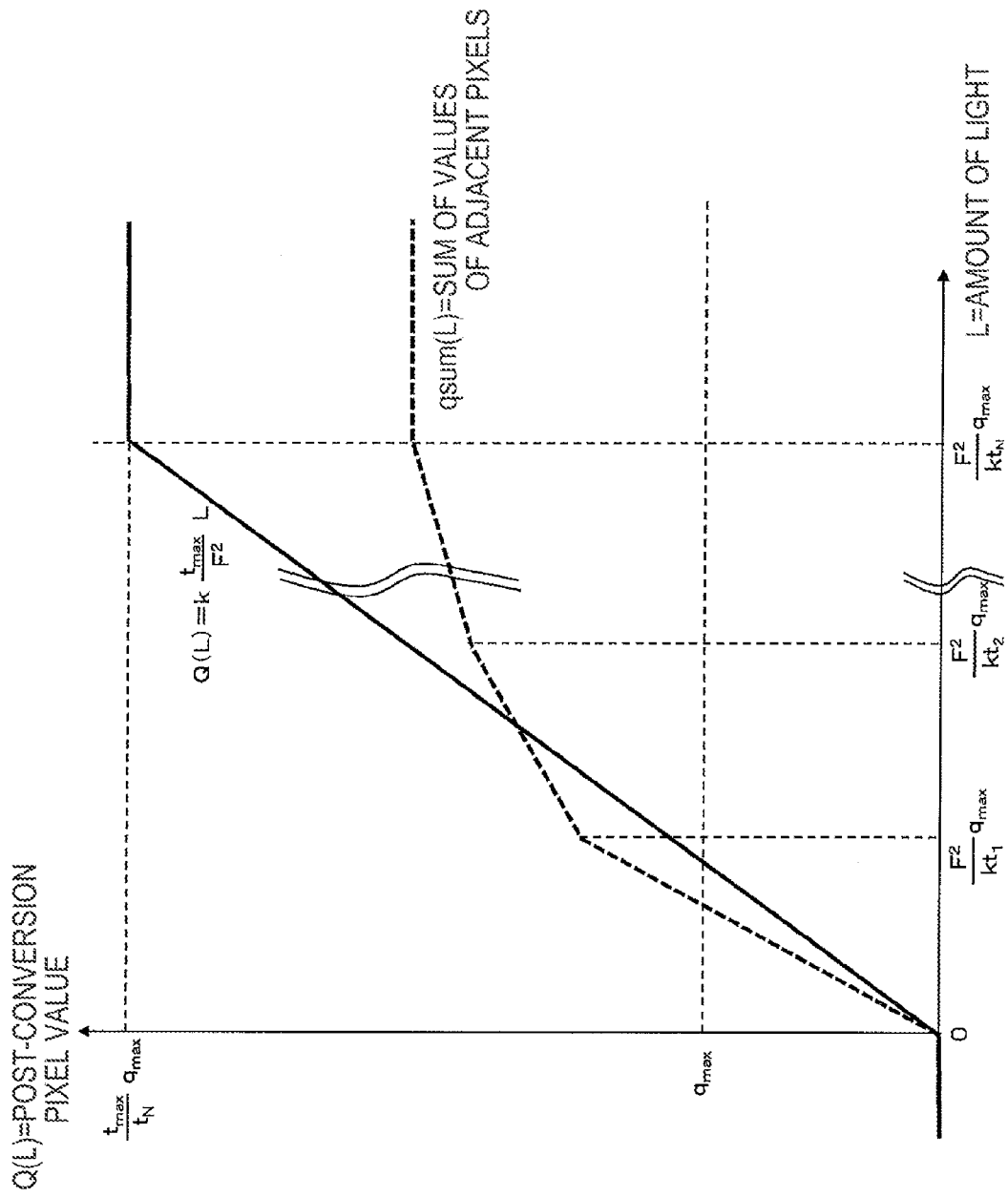
FIG. 10 is a figure that explains processing that converts the sum qsum(L) of the adjacent pixel values in the single channel that holds the N types of exposure times into a corrected pixel value Q(L) as an output pixel value.

Note that in this case, when the value of L is not less than the amount of light at which qsum(L) reaches saturation, as shown in FIG. 10, Q(L) also reaches saturation. The values a, b become as shown below.

[Math 7]

$$a = \begin{cases} \frac{t_{max}}{\sum_{i=1}^{N} t_i} & \text{if } (q(L, t_1) \le q_{max}) \\ \frac{t_{max}}{\sum_{i=n+1}^{N} t_i} & \text{if } (q(L, t_{n+1}) \le q_{max} < q(L, t_n)) \\ \frac{t_{max}}{Nt_N} & \text{if } (q_{max} < q(L, t_N)) \end{cases}$$

$$b = \begin{cases} 0 & \text{if } (q(L, t_1) \le q_{max} \text{ or } q_{max} < q(L, t_N)) \\ \frac{-nq_{max}t_{max}}{\sum_{i=n+1}^{N} t_i} & \text{if } (q(L, t_{n+1}) \le q_{max} < q(L, t_n)) \end{cases} \quad (7)$$

In the moving subject pixel signal processing portion 141 of the output image generation portion 122 that is shown in FIG. 4, expansion of the dynamic range is achieved by using the summing of the values of the surrounding pixels in this manner, but it is presumed that the region of the adjacent pixels for which the summing processing is performed, which must be of such a size that meaningful information can be obtained, must be detected as moving subject pixels.

Therefore, in a case where a single moving subject pixel exists within the stationary subject pixel region, it is difficult for the summing processing to compute an effective pixel value for that moving subject pixel.

However, as will be described in detail later, for the moving subject detection map that is generated by the moving subject detection processing in the moving subject detection portion 132, the detection of the moving subject is carried out with respect to a pixel region that is aggregated to a certain extent, so the moving subject pixel region is definitely defined as a region that includes a plurality of pixels, and this sort of problem can be avoided.

In contrast, the stationary subject pixel signal processing portion 142 of the output image generation portion 122 that is shown in FIG. 4 multiplies the gain appropriately for each individual pixel based on the values in the exposure control map. The output pixel values are computed by pixel value conversion processing that multiplies a large gain in a case where the exposure time is short and multiplies a small gain in a case where the exposure time is long.

Figure 11:
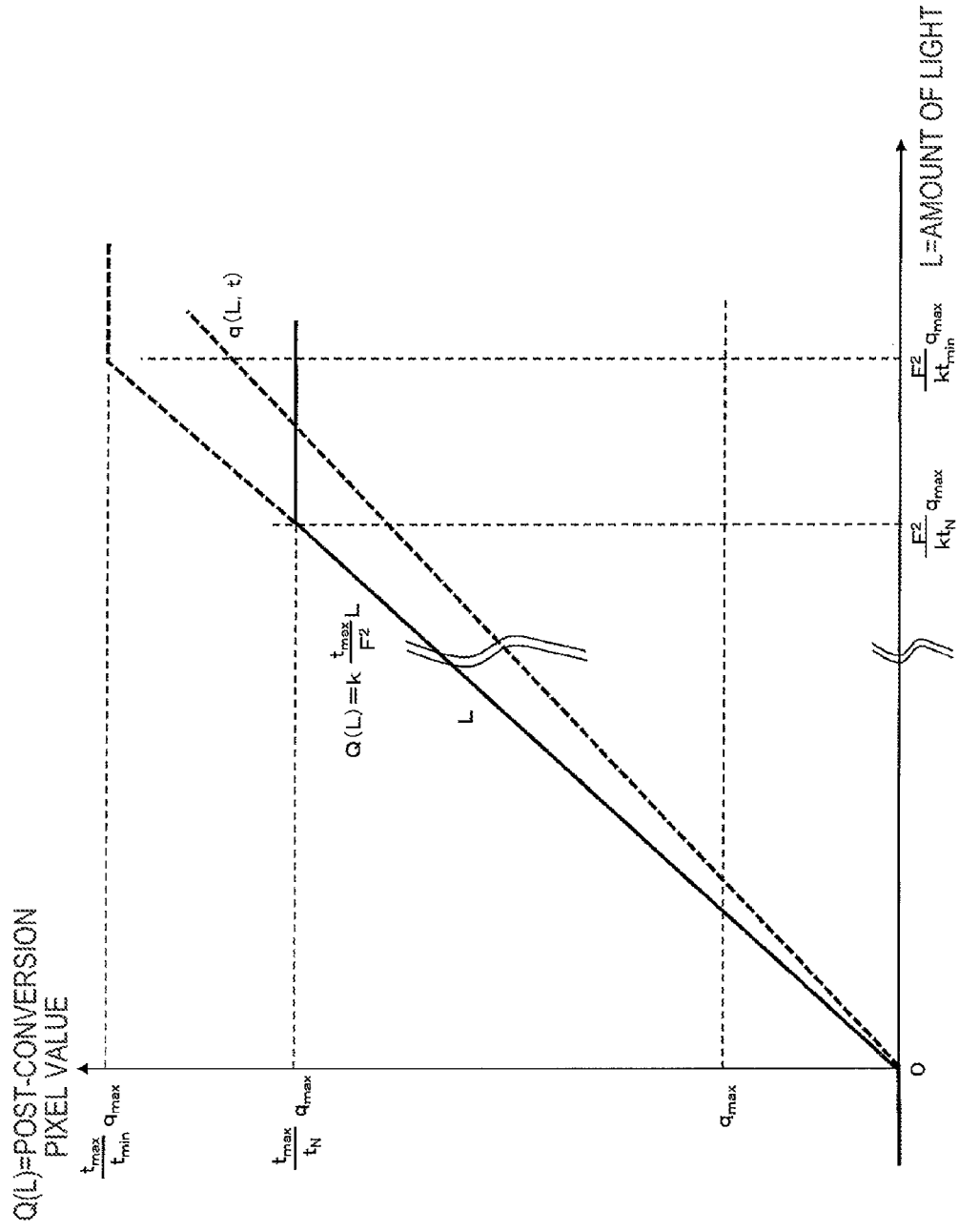
FIG. 11 is a figure that explains a correspondence between an amount of incident light L and the corrected pixel value Q(L)

In the same manner as in the moving subject pixel signal processing portion 141, the value that is converted is the pixel value Q(L) at the longest exposure time tmax, which can be quantized most widely. However, as shown in FIG. 11, when the amount L of the incident light exceeds the saturation level at the shortest exposure time tN in the moving subject pixel signal processing portion 141, the value that is converted is equal to the saturated pixel value in the moving subject pixel signal processing portion 141.

Specifically, the corrected pixel value Q(L) is derived by performing the computation below on the pixel value q(L, t) for the received amount of light L.

[Math 8]

$$Q(L) = \begin{cases} \frac{t_{max}}{t}q(L, t) & \text{if } \left(0 \le q(L, t) < \frac{t}{t_N}q_{max}\right) \\ \frac{t_{max}}{t_N}q_{max} & \text{if } \left(\frac{t}{t_N}q_{max} \le q(L, t)\right) \end{cases} \quad (8)$$

Next, the output selection portion 143 of the output image generation portion 122 that is shown in FIG. 4 inputs both the moving subject pixel signal processing results that have been generated by the moving subject pixel signal processing portion 141 and the stationary subject pixel signal processing results that have been generated by the stationary subject pixel signal processing portion 142, then selects the output pixel values by referring to the moving subject detection map for each individual pixel.

For those pixels that have been determined to be the moving subject in the moving subject detection map, the moving subject pixel signal processing results are selected, and for all the other pixels, the stationary subject pixel signal processing results are selected.

The intermediate output image that the output selection portion 143 outputs is an image with a wide dynamic range that has higher number of bits than does the input image that was obtained from the image capture portion 101. This wide dynamic range image is input to the signal processing portion 144 at the next stage.

The signal processing portion 144 performs image correction processing that is generally performed in a camera, that is, demosaicing, white balancing, color correction, noise reduction, grayscale correction, gamma correction, and the like, then generates the output image 105 as the final output result.

Next, the method for the moving subject detection that is performed by the moving subject detection portion 132 will be explained in concrete terms.

Figure 12:
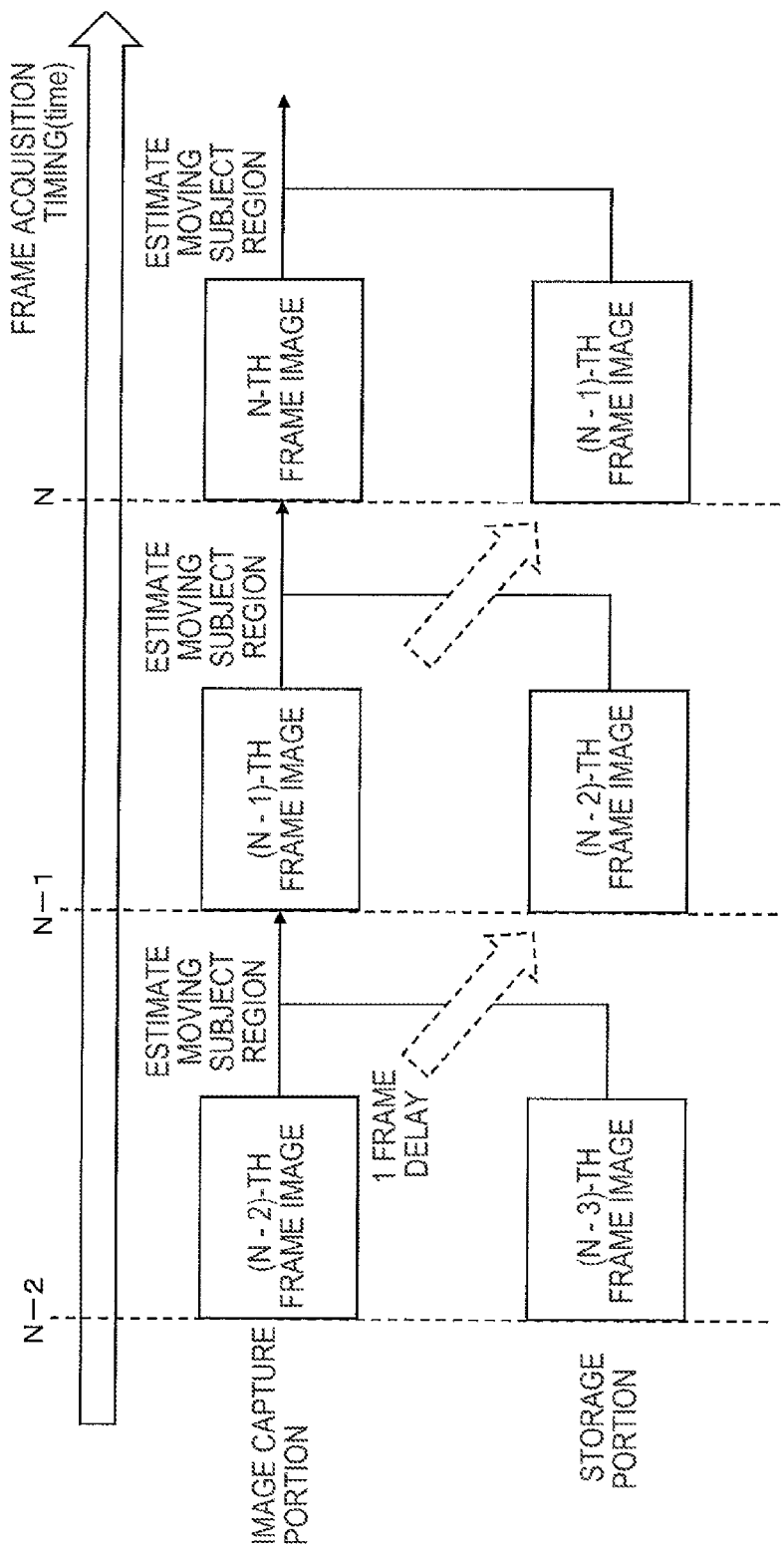
FIG. 12 is a figure that explains a flow of moving subject detection that is performed by a moving subject detection portion 132.

FIG. 12 is a figure that explains the flow of the moving subject detection that is performed by the moving subject detection portion 132.

The moving subject detection portion 132, at the time that an (N−2)-th frame image is captured by the image capture portion 101, acquires the (N−2)-th frame and an (N−3)-th frame image that has been stored in the storage portion 103, then performs an estimation of the moving subject region based on the two images.

Next, the moving subject detection portion 132, at the time that the (N−1)-th frame image is captured by the image capture portion 101, acquires the (N−1)-th frame and the (N−2)-th frame image that has been stored in the storage portion 103, then performs an estimation of the moving subject region based on the two images.

Next, the moving subject detection portion 132, at the time that the N-th frame image is captured by the image capture portion 101, acquires the N-th frame and the (N−1)-th frame image that has been stored in the storage portion 103, then performs an estimation of the moving subject region based on the two images.

In this manner, the moving subject detection portion 132 performs the processing that detects the moving subject region by successively switching the image it uses for a new image.

Figure 13:
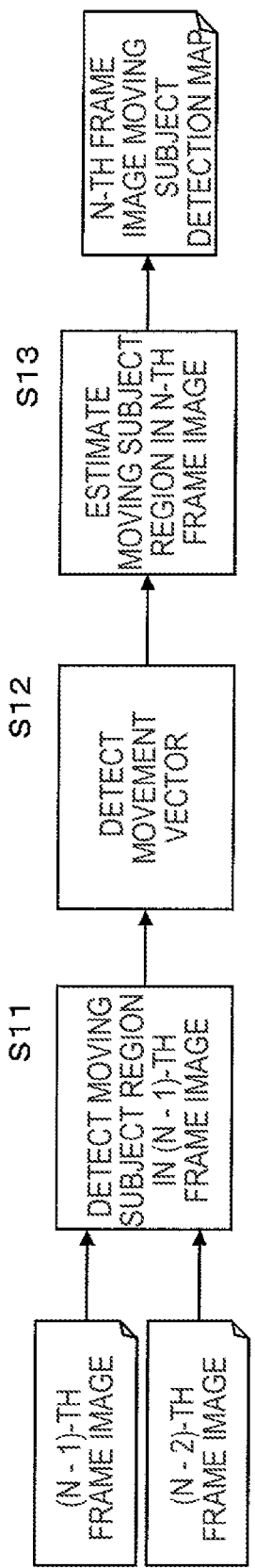
FIG. 13 is a figure that explains the flow of the moving subject detection that is performed by the moving subject detection portion 132.

The moving subject detection portion 132 estimates the moving subject region in the image that was acquired in the N-th frame by using two past images, that is, the image that was acquired in the (N−1)-th frame and the image that was acquired in the (N−2)-th frame. An overview of the processing will be explained with reference to FIG. 13.

The (N−1)-th frame image and the (N−2)-th frame image are input, and first, at Step S11, the detecting of the moving subject region in the (N−1)-th frame image is performed. The detecting of the region is performed by computing the absolute values of the differences between the pixel values in corresponding pixel positions in the two images, then comparing the absolute values to a predetermined threshold value.

If the absolute value of the difference for a given pixel is not less than the predetermined threshold value, the pixel is deemed to be a moving subject pixel.

If the absolute value of the difference for a given pixel is less than the predetermined threshold value, the pixel is deemed not to be a moving subject pixel, that is, is deemed to be a stationary subject pixel.

Next, at Step S12, a movement vector is derived for the pixels that have been deemed to be the moving subject region in the (N−1)-th frame image. The movement vector is derived using a gradient method.

Next, the moving subject region for the N-th frame is determined at Step S13 based on the movement vector that was derived for the pixels that have been deemed to be in the moving subject region of the (N−1)-th frame image.

The computation procedure will be explained.

When the absolute value of the difference in the pixel values that are the detected values at a given coordinate position k (xk, yk) is defined as α, the pixel is judged to be a detected pixel (a moving subject pixel) if α is not less than the threshold value.

Figure 14:
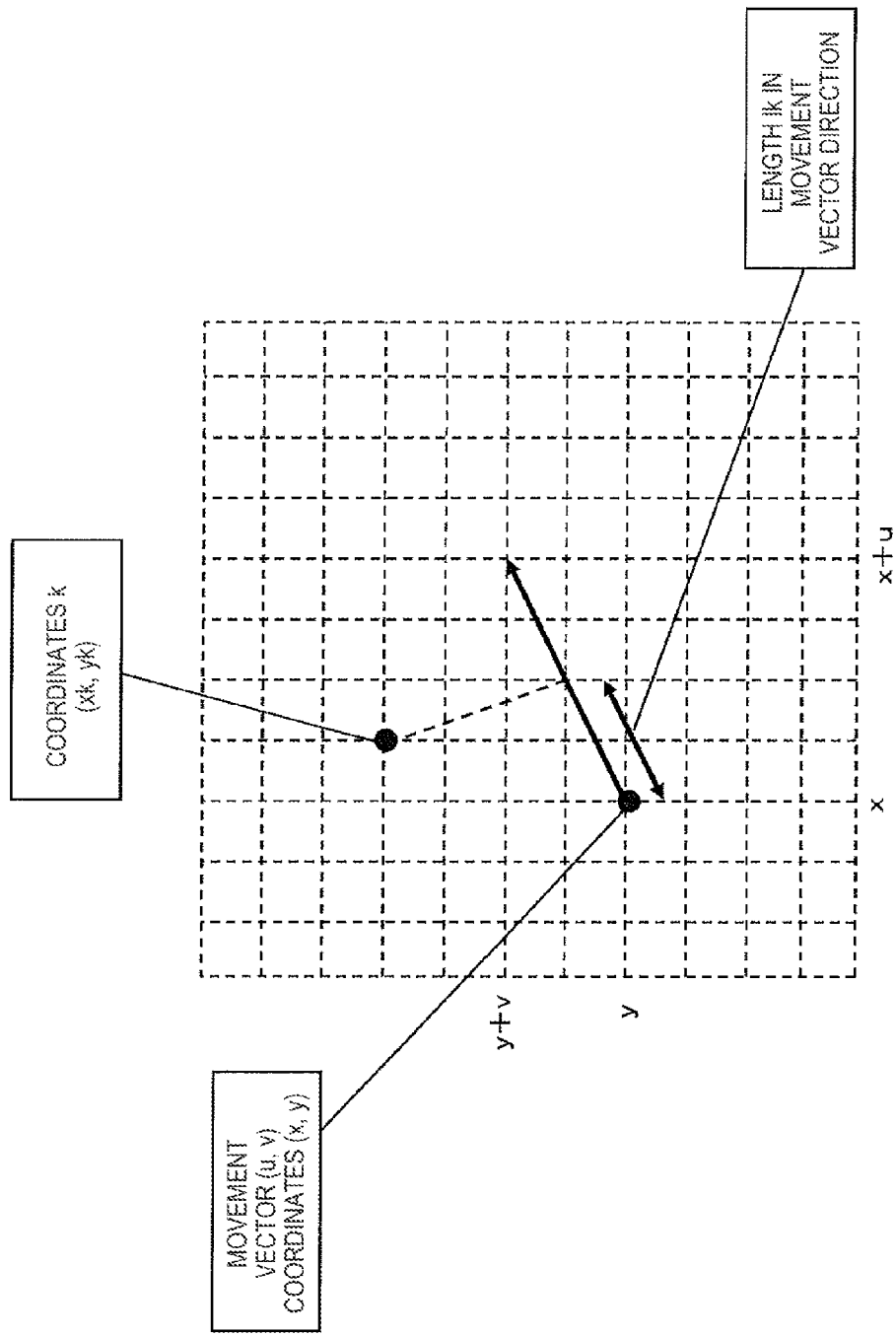
FIG. 14 is a figure that explains a specific example of the moving subject detection that is performed by the moving subject detection portion 132.

As is shown in FIG. 14, a length lk in the direction of the movement vector for the coordinate position k (xk, yk), in relation to a given movement vector (center (x, y), amount of movement (u, v)), is computed by the equation below.

[Math 9]

$$l_k = \frac{u(x_k - x) + v(y - y_k)}{\sqrt{u^2 + v^2}} \quad (9)$$

Figure 15:
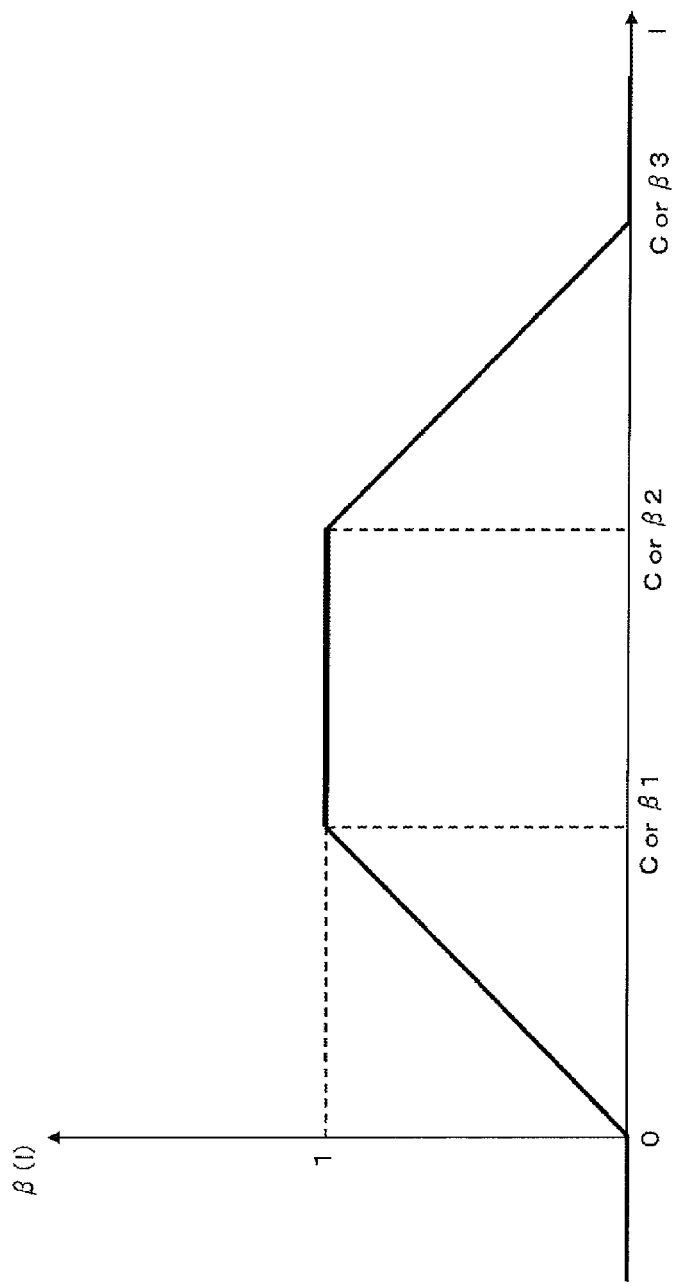
FIG. 15 is a figure that explains a correspondence relationship between a length l in a direction of a movement vector and a detected value $\beta(l)$ for the direction of the movement vector.

Furthermore, if the detected value in the direction of the movement vector is defined as β(1) when the length in the direction of the movement vector is 1, the value β(1) varies in accordance with 1, as shown in FIG. 15, and is computed by the equation below.

[Math 10]

$$\beta(l) = \begin{cases} 0 & (l \leq 0 \text{ or } Cor\beta_1 + Cor\beta_2 + Cor\beta_3 \leq l) \\ \dfrac{l}{Cor\beta_1} & (0 < l < Cor\beta_1) \\ 1 & (Cor\beta_1 \leq l \leq Cor\beta_1 + Cor\beta_2) \\ -\dfrac{1}{Cor\beta_3}(l - (Cor\beta_1 + Cor\beta_2 + Cor\beta_3)) & (Cor\beta_1 + Cor\beta_2 \leq l \leq Cor\beta_1 + Cor\beta_2 + Cor\beta_3) \end{cases} \quad (10)$$

In the equation above, Corβ1 to Corβ3 are variable parameters, and the value of the detected value β can be varied by varying these parameters.

The length in the direction of the normal vector is also added to the detected value α. In other words, the closer the detected value comes to the length in the direction to normal to the movement vector, the greater the detected value becomes. Therefore, the length m in the direction of the normal vector is computed.

Figure 16:
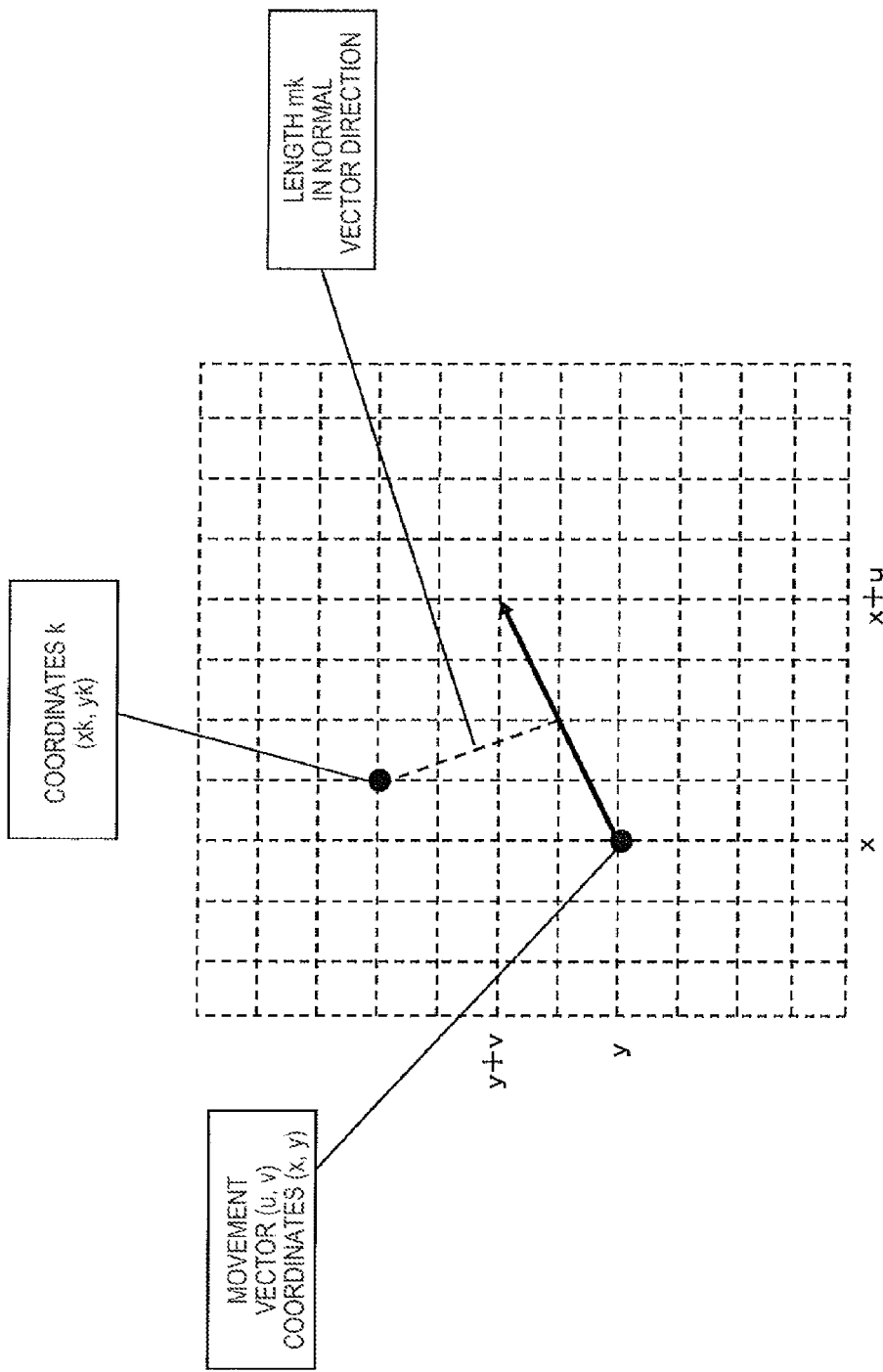
FIG. 16 is a figure that explains a relationship between the movement vector (center (x, y), movement (u, v)) and a length mk in the direction of a vector that is normal to the movement vector at coordinates k (xk, yk)

As is shown in FIG. 16, a length mk in the direction of the normal vector for the coordinate position k (xk, yk), in relation to a given movement vector (center (x, y), amount of movement (u, v)), is computed by the equation below.

[Math 11]

$$|m_k| = \frac{|v(x_k - x) - u(y_k - y)|}{\sqrt{u^2 + v^2}} \quad (11)$$

Figure 17:
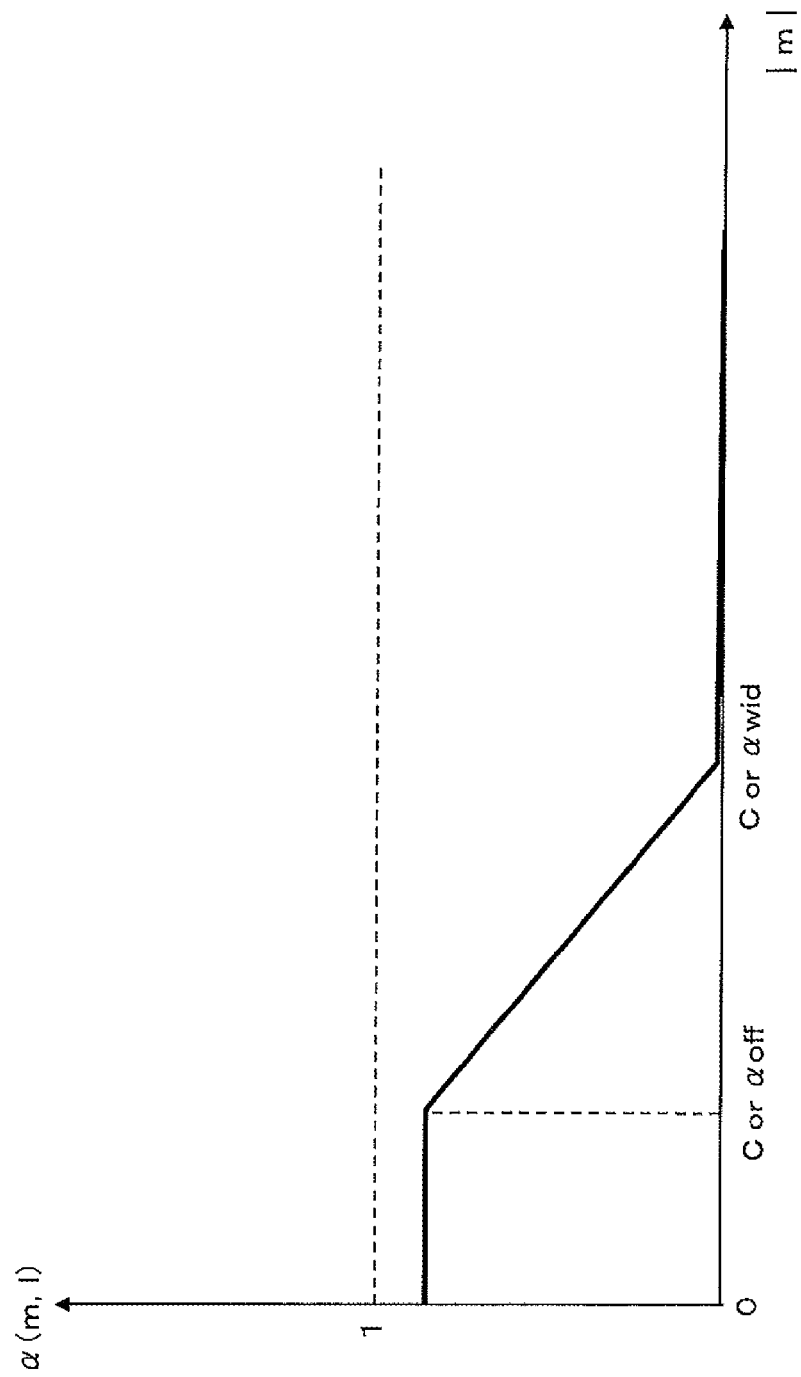
FIG. 17 is a figure that explains a correspondence relationship between a length m in the direction of the normal vector and a detected value $\alpha(m, 1)$ when the length in the direction of the movement vector is 1.

Furthermore, when the length in the direction of the movement vector is 1, and the length in the direction of the normal vector is m, the detected value α(m, 1) varies as shown in FIG. 17, and is computed by the equation below.

[Math 12]

$$\alpha(m, l) = \begin{cases} \beta(l) & (|m| \leq Cor\alpha_{off}) \\ -\dfrac{\beta(l)}{Cor\alpha_{wid}}(|m| - (Cor\alpha_{off} + Cor\alpha_{wid})) & (Cor\alpha_{off} < |m| < Cor\alpha_{off} + Cor\alpha_{wid}) \\ 0 & (Cor\alpha_{off} + Cor\alpha_{wid} \leq |m|) \end{cases} \quad (12)$$

In the equation above, Corαoff, Corαwid are variable parameters, and the value of the detected value α can be varied by varying these parameters.

The computation is made at all of the coordinate positions for all of the movement vectors for which the value α has been derived, and the maximum value is defined as the final detected value α.

Thus, providing the detected value that predicts the movement where the movement vector itself reaches its peak makes it possible to estimate the moving subject region with respect to a region that is aggregated to a certain extent.

The pixels for which the detected value α is not less than the threshold value are defined as the moving subject pixels, while all the other pixels are defined as the stationary subject pixels, such that a binary image in which the bits have values of 1 for the moving subject pixels and zero for the stationary subject pixels is output as the moving subject detection map.

2. Configuration and Processing of the Second Example of the Image Capture Device With the example that is described above, that is, with the configuration that was explained with reference to FIG. 2 and other drawings, the computation of the exposure times is performed by taking the captured image from the image capture portion 101 and inputting it in its existing state to the exposure control portion 121. However, the captured image from the image capture portion 101 may also be reduced, the reduced image may be input to an exposure control portion, and the exposure control portion may perform processing based on the reduced image.

Figure 18:
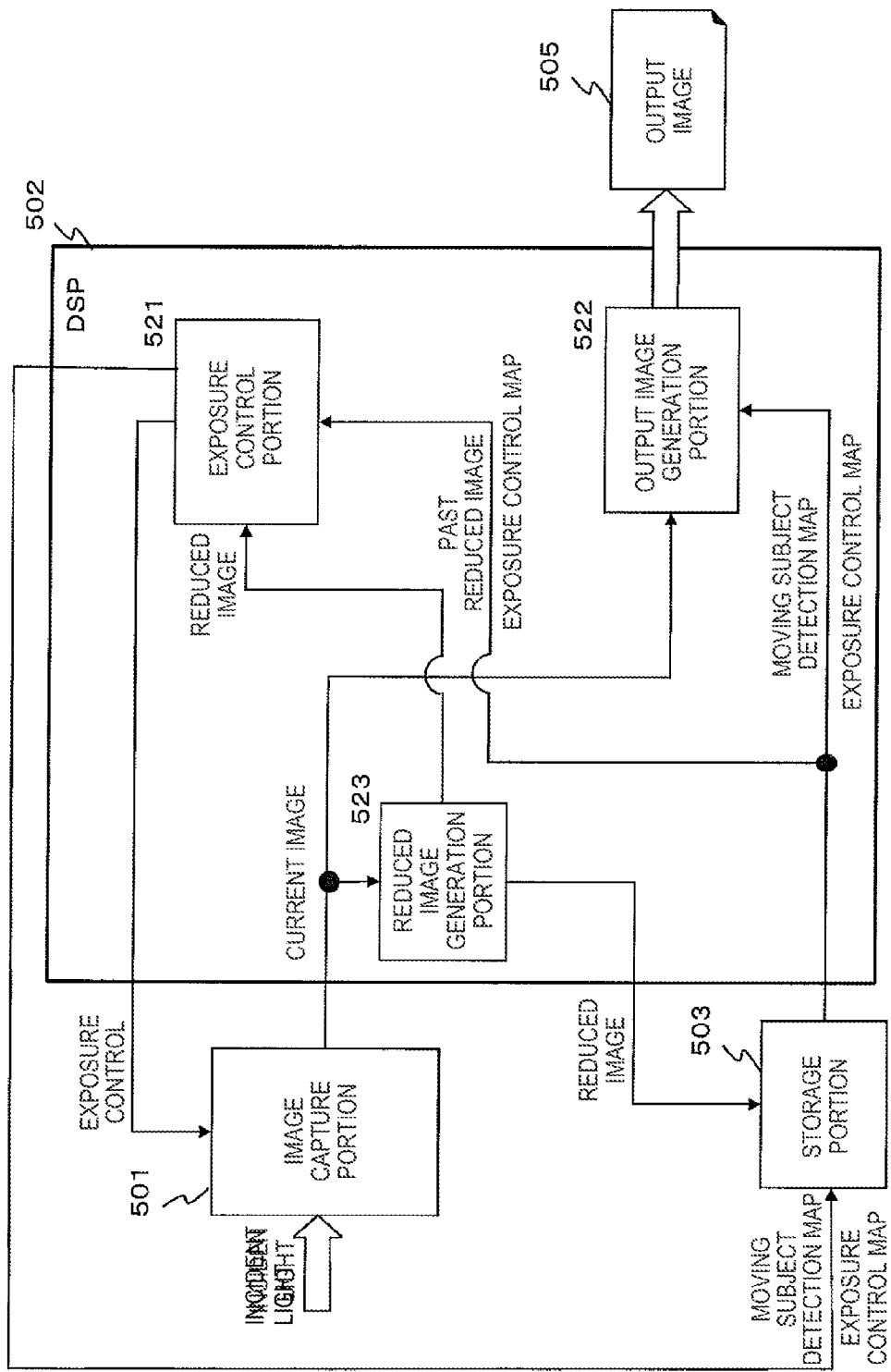
FIG. 18 is a figure that explains an example of a configuration of an image capture device according to a second example.

A configuration diagram of an image capture device that corresponds to this configuration is shown in FIG. 18.

In the image capture device that is shown in FIG. 18, the incident light undergoes photoelectric conversion in an image capture portion 501, after which the current image is input to a reduced image generation portion 523 of a DSP 502. The generation of the reduced image by the reduced image generation portion 523 may be performed as processing on only one channel of a brightness signal.

In concrete terms, the generation of the reduced image can, for example, be performed as processing that identifies the maximum values for the values (R, Gb, Gr, B) in the original RAW image, which will become the same pixels in the reduced image.

The reduced image that has been generated by the reduced image generation portion 523 is stored in a storage portion 503.

An exposure control portion 521 inputs the reduced image that the reduced image generation portion 523 has generated based on the current image, as well as a past reduced image that is stored in the storage portion 503, and the detection of the moving subject is performed by a moving subject detection portion within the exposure control portion 521.

In the same manner as in the previous example, the exposure control portion 521 according to the present example includes the moving subject detection portion and the appropriate exposure value computation portion that are shown in FIG. 3, and performs the generating of the moving subject detection map in the moving subject detection portion and the generating of the exposure control map in the appropriate exposure value computation portion. In the course of this processing, the processing load is lightened by using the reduced image.

Note that the exposure control for the image capture portion 501 is performed by taking exposure time setting information that has been generated based on the reduced image and restoring it to the size (number of pixels) of the original image capture element. For example, an exposure time that corresponds to one pixel in the reduced image and that has been set in the exposure control map that was generated based on a one-quarter size reduced image is used for four pixels of the original image capture element.

Figure 19:
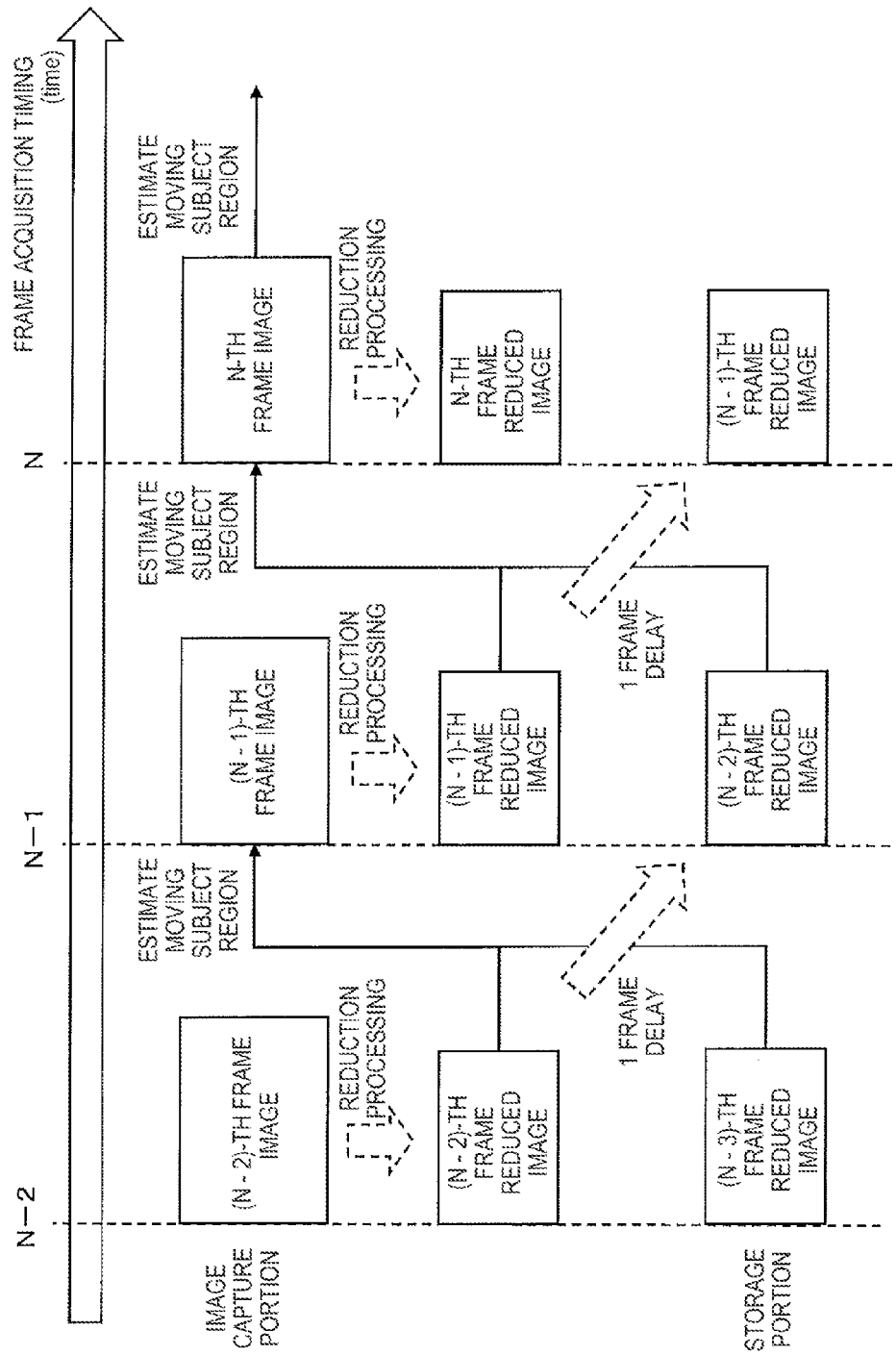
FIG. 19 is a figure that explains a flow of moving subject detection that is performed by a moving subject detection portion of the image capture device according to the second example.

FIG. 19 is a figure that shows the generating of the reduced image in the present example and the sequence of moving subject detection processing.

When the (N−2)-th frame image is captured by the image capture portion 501, the reduced image is generated in the reduced image generation portion 523, and the moving subject detection portion acquires the generated (N−2)-th frame reduced image and an (N−3)-th frame reduced image that has been stored in the storage portion 503, then performs the estimation of the moving subject region based on the two reduced images.

Next, when the (N−1)-th frame image is captured by the image capture portion 501, the reduced image is generated in the reduced image generation portion 523, and the moving subject detection portion acquires the generated (N−1)-th frame reduced image and the (N−2)-th frame reduced image that has been stored in the storage portion 503, then performs the estimation of the moving subject region based on the two reduced images.

Further, when the N-th frame image is captured by the image capture portion 501, the reduced image is generated in the reduced image generation portion 523, and the moving subject detection portion acquires the generated N-th frame reduced image and the (N−1)-th frame reduced image that has been stored in the storage portion 503, then performs the estimation of the moving subject region based on the two reduced images.

In this manner, the moving subject detection portion performs the processing that detects the moving subject region by successively switching the reduced image it uses for a new image.

Using the reduced images reduces the amount of computation for the moving subject detection and the amount of computation for the computation of the appropriate exposure times, and also reduces the sizes of the exposure control map and the moving subject detection map, so the volume of information that is stored in the storage portion 503 can be reduced.

On the other hand, the accuracy of the moving subject detection and the accuracy of the computation of the exposure times both decrease. If the moving subject cannot be detected, the problems of saturation and blocked up shadows once again occur, and the deterioration in the image quality becomes noticeable. A method for suppressing the adverse effects that are thus caused is known that modifies the detection parameters of the moving subject detection portion to make it easier to detect the moving subject. It is true that, when the parameters are modified in this manner, regions where there is no moving subject are detected, but it is possible to prevent regions where there is a moving subject from going undetected. One of the adverse effects that arise from over-detection is a decrease in resolution in the affected regions, but in most cases, a decrease in the resolution of a small region is less obvious than the occurrence of saturation and blocked up shadows. The problem of the decreased accuracy of the computation of the appropriate exposure times is noticeable, but in most cases, a scene in which the appropriate exposure varies significantly within an extremely small surrounding region does not really need to be viewed as very much of a problem.

Figure 20:
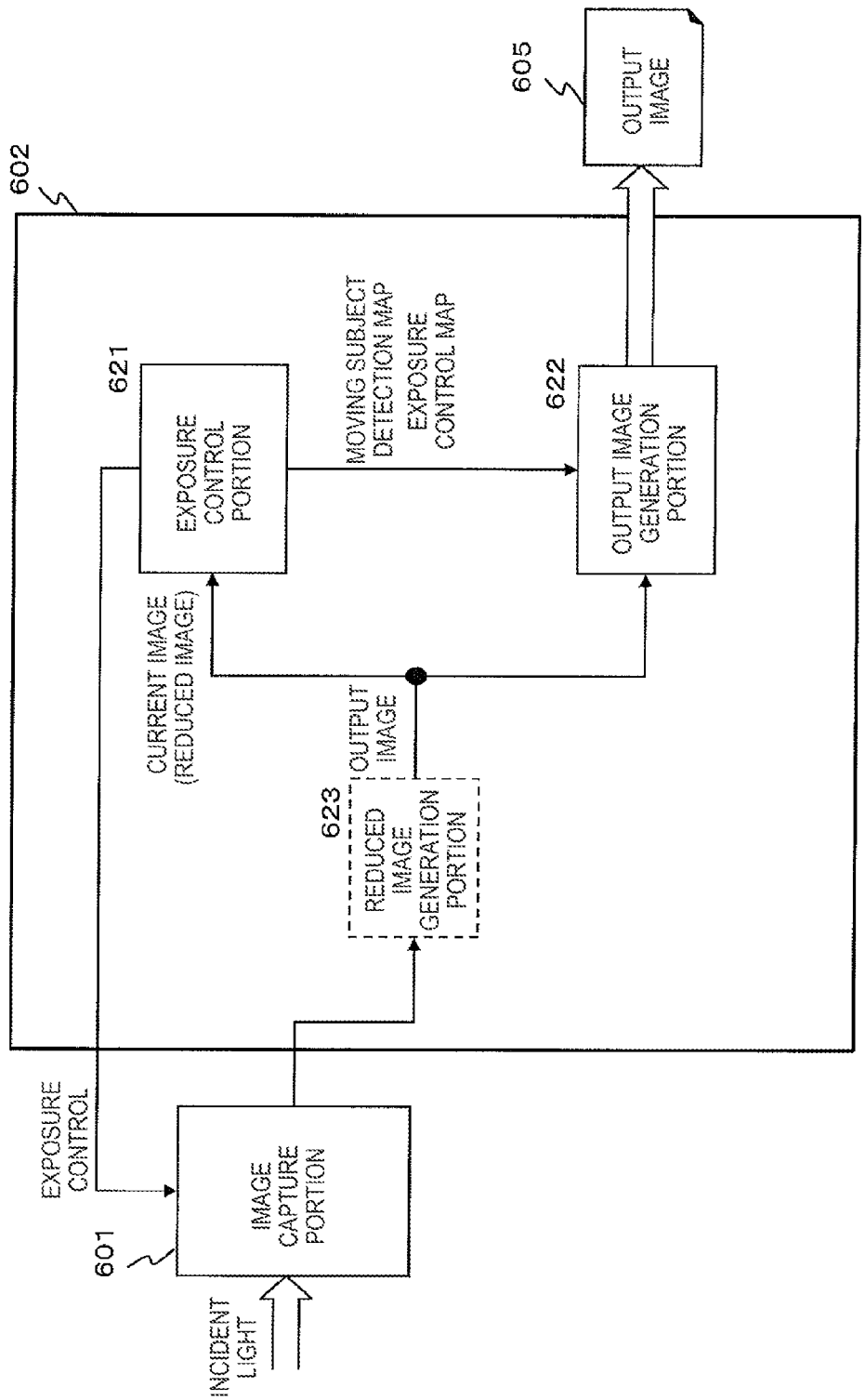
FIG. 20 is a figure that explains an example of a configuration of an image capture device according to a third example.

3. Configuration and Processing of the Third Example of the Image Capture Device The third example, which will be explained next, is an example that is configured without the storage portion that is used in the first and second examples. The configuration of the image capture device according to the present example is shown in FIG. 20.

Note that a reduced image generation portion 623 is not essential, but if it is provided, it achieves the reduction in the processing load in the same manner as in the second example that is described above.

A current image that is an image capture result that is produced by an image capture portion 601 is input to an exposure control portion 621 and an output image generation portion 622 of a DSP 602. Note that in this case, the input image may also be the reduced image.

The current image (the reduced image) is input to both the exposure control portion 621 and the output image generation portion 622, and a one-bit control setting parameter for exposure control is input separately to the exposure control portion 621. The parameter is created based on setting information that the user inputs through an input portion, for example.

Figure 21:
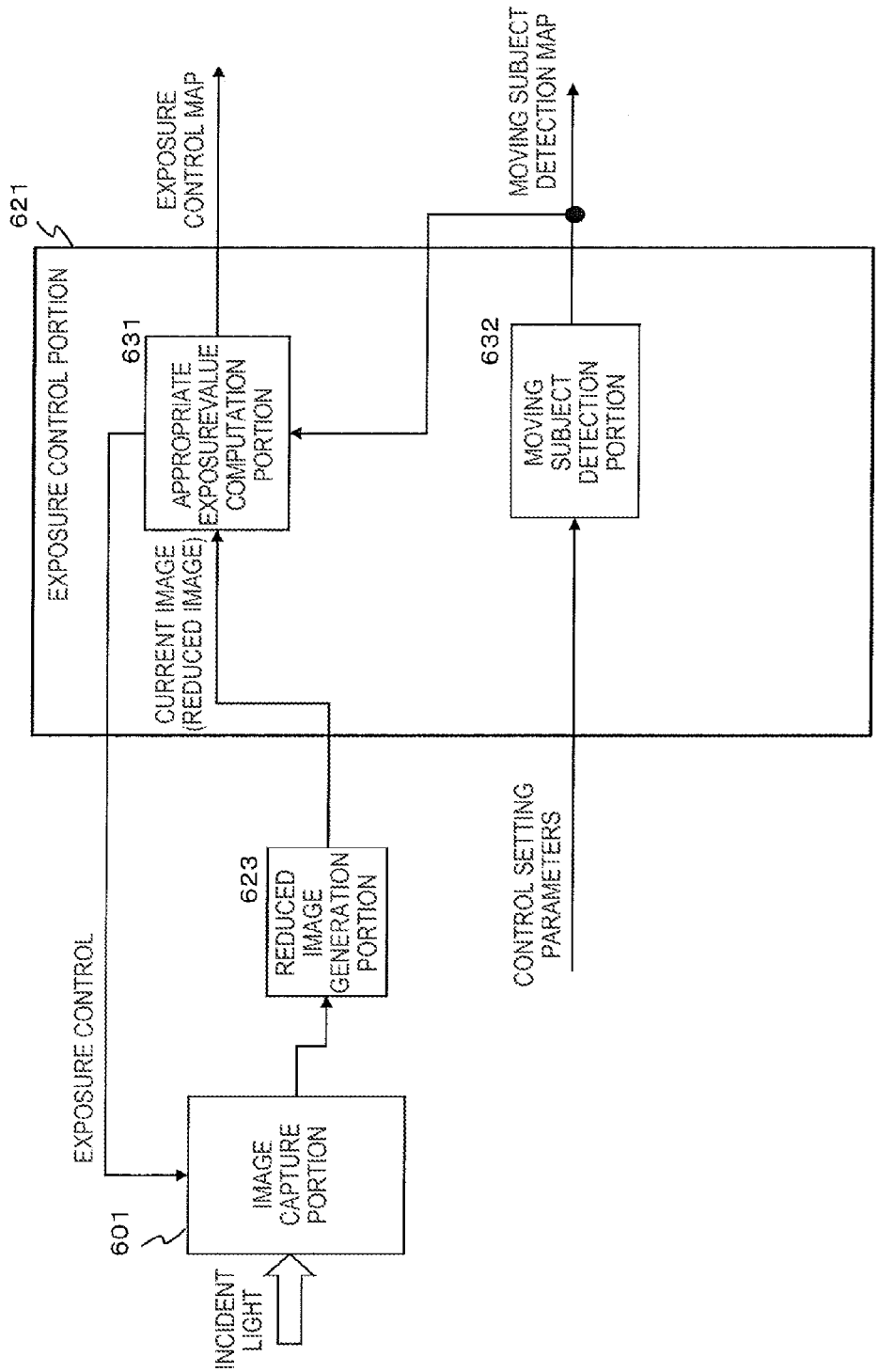
FIG. 21 is a figure that explains a configuration and processing of an exposure control portion 621 of the image capture device according to the third example.

As shown in FIG. 21, the control setting parameter is input to a moving subject detection portion 632. In accordance with the setting parameter, the moving subject detection portion 632 outputs one of a moving subject detection map in which the entire image is defined as moving subject pixels and a moving subject detection map in which the entire image is defined as stationary subject pixels.

The moving subject detection map that the moving subject detection portion 632 has generated is passed to an appropriate exposure value computation portion 631. In the appropriate exposure value computation portion 631, the exposure time setting processing that was explained previously in the first example is performed in accordance with whether the moving subject detection map is the one in which the entire image is defined as moving subject pixels or the one in which the entire image is defined as stationary subject pixels, and the exposure times are computed for the individual pixels.

In other words, in a case where the moving subject detection map that has been generated by the moving subject detection portion 632 is the moving subject detection map in which the entire image is defined as moving subject pixels, the exposure control map is generated in which the exposure times are set for all of the pixels in the fixed pattern that was explained with reference to FIG. 7, for example, and the exposure control is then performed.

In contrast, in a case where the moving subject detection map that has been generated by the moving subject detection portion 632 is the moving subject detection map in which the entire image is defined as stationary subject pixels, the exposure control map is generated in which the exposure times are set for all of the pixels in accordance with the brightness of the subject, and the exposure control is then performed.

Note that in the present configuration, the exposure control map and the moving subject detection map that are the outputs from the exposure control portion 621 are not stored in a storage portion, but are passed directly to the output image generation portion 622, as shown in FIG. 20.

The output image generation portion 622 has the same configuration that was explained with reference to FIG. 4 in the earlier first example, and generates the output image by performing the same processing that was explained with reference to FIG. 4.

In the present example, it is not possible to perform the detecting of the moving subject as is done in the first and second examples, and the method of exposure control cannot be changed for each individual region, but the present example does have the advantage of making the storage portion unnecessary.

4. Configuration and Processing of the Fourth Example of the Image Capture Device In the first example that was described previously, in the movement vector computation processing in the moving subject detection processing of the moving subject detection portion 132, an example was explained in which a gradient method is used, but a block matching method may also be used instead of the gradient method. In a case where the block matching method is used, the accuracy is higher, but the computational load increases.

5. Summary of the Configurations of the Present Disclosure

It should be understood by those skilled in the art that various modifications, combinations, sub-combinations and alterations may occur depending on design requirements and other factors insofar as they are within the scope of the appended claims or the equivalents thereof.

Furthermore, the processing sequence that is explained in the specification can be implemented by hardware, by software and by a configuration that combines hardware and software. In a case where the processing is implemented by software, it is possible to install in memory within a computer that is incorporated into dedicated hardware a program in which the processing sequence is encoded and to execute the program. It is also possible to install a program in a general-purpose computer that is capable of performing various types of processing and to execute the program. For example, the program can be installed in advance in a storage medium. In addition to being installed in a computer from the storage medium, the program can also be received through a network, such as a local area network (LAN) or the Internet, and can be installed in a storage medium such as a hard disk or the like that is built into the computer.

Note that the various types of processing that are described in this specification may not only be performed in a temporal sequence as has been described, but may also be performed in parallel or individually, in accordance with the processing capacity of the device that performs the processing or as needed. Furthermore, the system in this specification is not limited to being a configuration that logically aggregates a plurality of devices, all of which are contained within the same housing.

INDUSTRIAL APPLICABILITY

As explained above, according to the configuration of one of the examples of the present disclosure, the determining of the moving subject region is performed based on the input image information from the image capture portion, the moving subject detection map is generated, and the generated moving subject detection map is used to set an exposure pattern for a moving subject detected pixel region, the exposure pattern being a pattern in which a plurality of different exposure times are cyclically arranged. For a stationary subject region the setting of the exposure times is performed in accordance with the brightness of the subject.

With respect to an image that is captured based on this sort of exposure time control, the output image is generated by computing pixel values with a wide dynamic range for the moving subject region, using pixel value combination processing that utilizes the pixel values of pixels for which a plurality of different exposure times have been set, and by computing pixel values with a wide dynamic range for the stationary subject region by multiplying the gain in accordance with the exposure time. This processing achieves the acquisition of a wide dynamic range image across all of the regions while keeping deterioration of the resolution to a minimum.

The present application contains subject matter related to that disclosed in Japanese Priority Patent Application JP 2011-102914 filed in the Japan Patent Office on May 2, 2011, the entire content of which is hereby incorporated by reference.

What is claimed is:

1. An image capture device, comprising:
    an image capture circuit comprising an image sensor configured to convert incident light into electrical signals; and
    at least one computer processor programmed to:
    generate a moving subject detection map that includes moving subject region identification information for a current image received from the image capture circuit;
    generate an exposure control map based, at least in part, on the moving subject detection map and having an exposure pattern that cyclically applies a plurality of different exposure times to a moving subject region identified by the moving subject detection map;
    output exposure control signals to the image capture circuit based, at least in part, on the exposure control map; and
    determine output image pixel values by combining a plurality of pixel value information items for a plurality of pixels for which the plurality of the different exposure times have been set that are derived from the moving subject region.

2. The image capture device according to claim 1, wherein generating the exposure control map further comprises:
    setting an exposure time for a stationary subject region of the exposure control map in accordance with a brightness of the subject in the stationary subject region of the current image.

3. The image capture device according to claim 1,
    wherein generating the exposure control map comprises generating the exposure control map to define the exposure pattern for the moving subject region such that a same exposure time is not set for adjacent pixels in the moving subject region.

4. The image capture device according to claim 1,
    wherein determining the output image pixel values comprises determining the output pixel values to have a wider dynamic range than pixel values of corresponding individual pixels of the current image received from the image capture circuit.

5. The image capture device according to claim 1,
    wherein determining the output image pixel values comprises determining the output image pixel values for at least some pixels by multiplying a large gain for a pixel where the exposure time is short and multiplying a small gain for a pixel where the exposure time is long.

6. The image capture device according to claim 1, wherein the at least one computer processor is further programmed to reduce the current image received from the image capture circuit, and generate the moving subject detection map, the exposure control map, and the exposure control signals based, at least in part, on the reduced image.

7. The image capture device according to claim 1, further comprising:
    a storage device configured to store the current image received from the image capture circuit, and
    wherein generating the moving subject detection portion comprises generating the moving subject detection map based, at least in part, on the current image received from the image capture circuit and a past image stored by the storage device.

8. An image capture device control method that is implemented in an image capture device, comprising:
    capturing, by an image capture circuit, a current image;
    generating a moving subject detection map that includes moving subject region identification information for the current image;
    generating an exposure control map based, at least in part, on the moving subject detection map, wherein the exposure control map includes an exposure pattern that cyclically applies a plurality of different exposure times to a moving subject region identified by the moving subject detection map;
    outputting based, at least in part, on the exposure control map, exposure control signals to the image capture circuit; and
    determining output image pixel values by combining a plurality of pixel value information items for a plurality of pixels for which the plurality of the different exposure times have been set that are derived from the moving subject region.

9. A non-transitory storage medium having stored thereon a program that causes image capture device control processing to be performed in an image capture device, the program comprising:
    capturing, by an image capture circuit, a current image;
    generating a moving subject detection map that includes moving subject region identification information for the current image;
    generating an exposure control map based, at least in part, on the moving subject detection map, wherein the exposure control map includes an exposure pattern that cyclically applies a plurality of different exposure times to a moving subject region identified by the moving subject detection map;
    outputting based, at least in part, on the exposure control map, exposure control signals to the image capture circuit; and
    determining output image pixel values by combining a plurality of pixel value information items for a plurality of pixels for which the plurality of the different exposure times have been set that are derived from the moving subject region.

* * * * *